(12) United States Patent
Ito

(10) Patent No.: US 10,634,878 B2
(45) Date of Patent: Apr. 28, 2020

(54) ZOOM LENS AND IMAGE PICKUP APPARATUS HAVING THE SAME

(71) Applicant: CANON KABUSHIKI KAISHA, Tokyo (JP)

(72) Inventor: Daisuke Ito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 132 days.

(21) Appl. No.: 15/854,413

(22) Filed: Dec. 26, 2017

(65) Prior Publication Data

US 2018/0180848 A1 Jun. 28, 2018

(30) Foreign Application Priority Data

Dec. 27, 2016 (JP) .................. 2016-252696

(51) Int. Cl.
| | | |
|---|---|---|
| *G02B 15/14* | (2006.01) | |
| *G02B 13/00* | (2006.01) | |
| *G02B 13/02* | (2006.01) | |
| *G02B 15/177* | (2006.01) | |

(52) U.S. Cl.
CPC .......... *G02B 13/004* (2013.01); *G02B 13/02* (2013.01); *G02B 15/177* (2013.01)

(58) Field of Classification Search
CPC .... G02B 13/004; G02B 13/009; G02B 15/14; G02B 15/177
See application file for complete search history.

(56) References Cited

U.S. PATENT DOCUMENTS

| | | |
|---|---|---|
| 2009/0268308 A1 | 10/2009 | Masugi |
| 2010/0014169 A1 | 1/2010 | Tamura |
| 2010/0128364 A1* | 5/2010 | Agatsuma ............ G02B 15/177 359/689 |
| 2012/0140327 A1 | 6/2012 | Abe et al. |

(Continued)

FOREIGN PATENT DOCUMENTS

| | | |
|---|---|---|
| JP | 2007004122 A | 1/2007 |
| JP | 2007079326 A | 3/2007 |
| JP | 2007279184 A | 10/2007 |

(Continued)

OTHER PUBLICATIONS

Notification of Reasons for Refusal issued in corresponding Japanese Application No. 2016-252696 dated Oct. 9, 2018 with English translation, 12 pages.

*Primary Examiner* — Alicia M Harrington
(74) *Attorney, Agent, or Firm* — Carter, DeLuca & Farrell LLP

(57) ABSTRACT

A zoom lens includes a unit LN, a unit LP and a rear group LR, and the rear group LR has a positive unit LRP on a side closest to an image, where the unit LRP includes a positive lens GRP that has a meniscus shape having a convex surface facing the image side thereof and made of resin material. Focal lengths of the zoom lens at wide-angle end, the unit LRP, and the unit LP, back focus at telephoto end, an amount of movement of the unit LRP when zooming from wide-angle end to telephoto end, thickness on an optical axis of the positive lens GRP, and a distance in optical axis direction between center on a lens surface on object side of the positive lens GRP and an end of an effective surface of the lens surface on the object side are each appropriately set.

19 Claims, 16 Drawing Sheets

(56) References Cited

U.S. PATENT DOCUMENTS

2012/0307372 A1   12/2012   Ichikawa et al.

FOREIGN PATENT DOCUMENTS

| JP | 2007327991 A | 12/2007 |
| JP | 2008281857 A | 11/2008 |
| JP | 2012-108333 A | 6/2012 |
| JP | 2013057738 A | 3/2013 |

* cited by examiner

ZOOM LENS AND IMAGE PICKUP APPARATUS HAVING THE SAME

CROSS REFERENCE TO RELATED APPLICATIONS

This application claims the benefit of Japanese Patent Application No. 2016-252696, filed Dec. 27, 2016, which is hereby incorporated by reference herein in its entirety.

BACKGROUND OF THE INVENTION

Field of the Invention

The present invention relates to a zoom lens and an image pickup apparatus having the same.

Description of the Related Art

In recent years, it is desired for imaging optical systems used in image pickup apparatuses to be a compact zoom lens having high optical performance over the entire zoom range. It is also desired to use a large-sized image pickup device (sensor) according to the demand for high image quality, and to have high optical performance over the entire screen at the same time.

When it is tried to achieve high image quality by using a large-sized image pickup device, the effective diameter of the lens (on the side closest to image) increases which is arranged in front of the image pickup device, and the weight also increases. Furthermore, if the lens surface of the lens is a concave surface, which is arranged at the side closest to the image and faces the image side, the light returns that has passed through the concave surface and has been reflected by the image plane on the image side or by the surface of the optical filter and the like, reflects by the concave surface, and is incident on the image plane to cause a ghost in some cases.

Conventionally, the material of the lens that is arranged at the side closest to the image is made of a resin, and this lens is formed into a meniscus shape of which the convex surface faces the image side. A zoom lens is known that reduces the occurrence of the ghost which originates from the lens surface, while reducing the weight of the lens arranged at the side closest to the image.

In Japanese Patent Application Laid-Open No. 2012-108333, the zoom lens includes a first lens unit having a negative refractive power, a second lens unit having a positive refractive power, and a third lens unit having a positive refractive power. The zoom lens is proposed which corresponds to a large size sensor and having a magnification of approximately three, and in which the third lens unit that is the final lens unit is formed of a single lens having a meniscus shape, of which the convex surface faces the image side.

In U.S. Patent Application Publication No. 2012/0140327, a zoom lens having a magnification of approximately three is proposed, which includes a first lens unit having a negative refractive power, a second lens unit having a positive refractive power, and a third lens unit having a positive refractive power, and in which the third lens unit that is the final lens unit is formed of a single lens having a meniscus shape, of which the convex surface faces the image side.

In U.S. Patent Application Publication No. 2009/0268308, the zoom lens includes a first lens unit having a negative refractive power, a second lens unit having a positive refractive power, and a third lens unit having a positive refractive power. The zoom lens is proposed which corresponds to a small size sensor and has a magnification of approximately 3.8, and in which the third lens unit that is the final lens unit is formed of a single lens having a meniscus shape, of which the convex surface faces the image side.

In U.S. Patent Application Publication No. 2012/0307372, the zoom lens includes a first lens unit having a negative refractive power, a second lens unit having a positive refractive power, a third lens unit having a negative refractive power, and a fourth lens unit having a positive refractive power. The zoom lens having a magnification of approximately 3.8 is proposed, in which the fourth lens unit that is the final lens unit is formed of a single lens having a meniscus shape, of which the convex surface faces the image side.

In U.S. Patent Application Publication No. 2010/0014169, the zoom lens includes a first lens unit having a positive refractive power, a second lens unit having a negative refractive power, a third lens unit having a positive refractive power, and a fourth lens unit having a positive refractive power. The zoom lens having a magnification of approximately three is proposed, in which the fourth lens unit that is the final lens unit is formed of a single lens having a meniscus shape, of which the convex surface faces the image side.

In a zoom lens, if it is attempted to secure a predetermined zoom ratio while trying to reduce the size and the weight of the whole system, many aberrations occur and the optical performance becomes low. In addition, if it is attempted to enhance the image quality by using a large-sized image pickup device, an angle of the off-axis aberration incident on the image pickup device increases (becomes large), and the optical performance around the screen becomes low. In a zoom lens, in order to obtain high optical performance over the entire screen by using an image pickup device having a large effective area while miniaturizing the whole system, it becomes important to appropriately set the number of lens units, the refractive power of each lens unit, lens configuration and the like.

In particular, when the image plane becomes large, the lens arranged at the side closest to the image becomes large correspondingly. For this reason, it becomes important to appropriately set the refractive power of the lens unit arranged at the side closest to the image, the shape of the lens, and the like. If these settings are not appropriate, it becomes difficult to obtain a zoom lens of which the whole system is compact, and which has a wide angle of view and a high optical performance over the entire zoom range. If a resin having a smaller specific gravity than that of glass is used as a material of the lens arranged at the side closest to the image, it becomes easy to reduce the weight of the whole system.

However, in the case of the lens using a resin, the shape of the lens results in changing due to changes of environment such as temperature change and moisture absorption, and the optical performance results in changing. In addition, when coating is formed on the lens surface, the reflection from the lens surface shows higher reflectivity than that in the case where the lens is made of glass, the image quality deteriorates, and the tendency of the ghost occurrence particularly due to the surface reflection increases. Therefore, when the lens made from a resin is used in the side closest to the image, it becomes important to appropriately set the refractive power of the lens, the lens shape and the like.

SUMMARY OF THE INVENTION

The zoom lens in the present invention has a lens unit LN having a negative refractive power, a lens unit LP that is arranged adjacent to an image side of the lens unit LN and has a positive refractive power, and a rear lens group that includes one or more lens units arranged on an image side of the lens unit LP, wherein a distance between the adjacent lens units changes at the time of zooming, wherein the rear lens group includes a lens unit LRP having a positive refractive power and arranged on a side closest to an image, wherein the lens unit LRP includes a positive lens GRP using a resin material and having a meniscus shape with a convex surface on the image side; and the following conditional expressions are satisfied:

$0.15 < BkT/fW < 0.50$, $8.0 < fRP/mRP < 50.0$, $1.40 < fRP/fLP < 3.50$, and $-3.00 < R1sag/DGRP < -0.15$, where fW represents a focal length of the zoom lens at a wide-angle end, BkT represents a back focus at a telephoto end, fRP represents a focal length of the lens unit LRP, mRP represents an amount of movement of the lens unit LRP at the time of zooming from the wide-angle end to the telephoto end, fLP represents a focal length of the lens unit LP, DGRP represents a thickness on an optical axis of the positive lens GRP, R1sag represents a distance in an optical axis direction between a lens center on a lens surface on an object side of the positive lens GRP and an end of an effective surface of the lens surface on the object side, and a sign of the amount of movement is determined to be minus when the lens unit is positioned at a side closer to an object at the telephoto end compared to the wide-angle end, and be plus when the lens unit is positioned at a side closer to the image.

Further features of the present invention will become apparent from the following description of exemplary embodiments with reference to the attached drawings.

DESCRIPTION OF THE EMBODIMENTS

Embodiments which can be carried out according to the present invention will be described in detail below with reference to the attached drawings. The zoom lens in the present invention has a lens unit LN having a negative refractive power (optical power=reciprocal of focal length), a lens unit LP which is arranged so as to be adjacent to an image side of the lens unit LN and has a positive refractive power, and a rear lens group which includes one or more lens units arranged on an image side of the lens unit LP. At the time of zooming, distances among the adjacent lens units change. The rear lens group has a lens unit LRP having a positive refractive power in the side closest to the image, and the lens unit LRP includes a positive lens GRP using a resin material and having a meniscus shape, of which the convex surface faces the image side.

Figure 1:
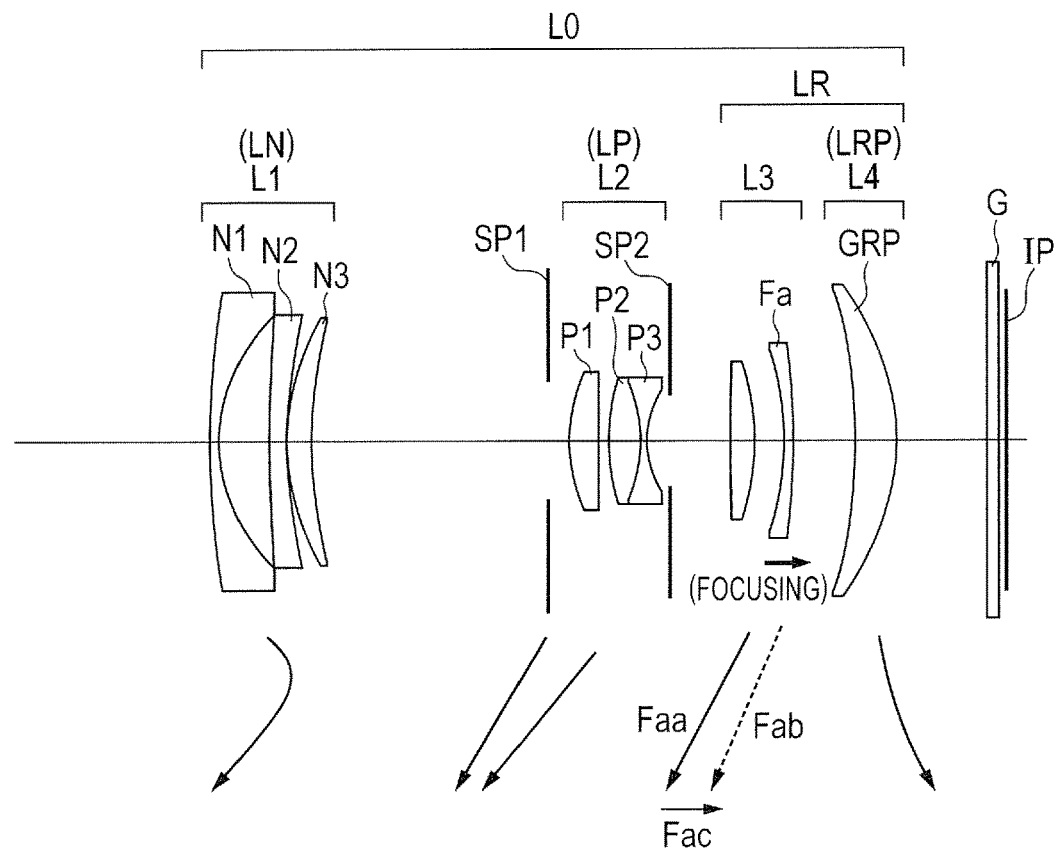
FIG. 1 is a cross-sectional view of a zoom lens at a wide-angle end in Embodiment 1.
Figure 2A:
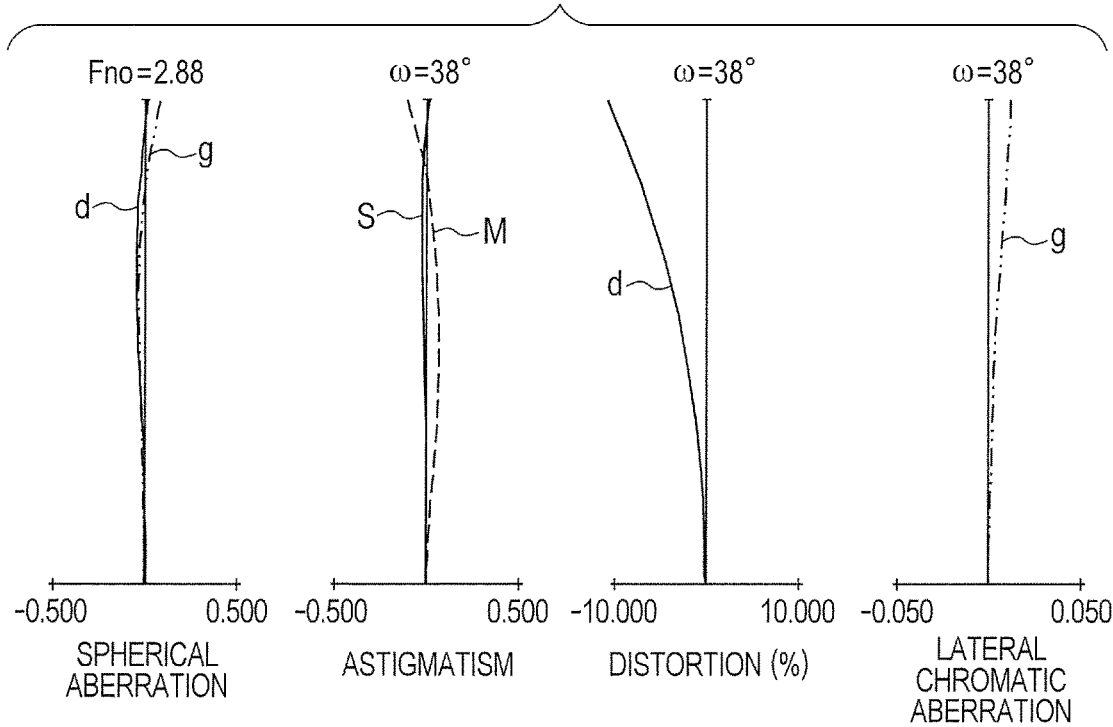
FIG. 2A is an aberration diagram of the zoom lens at the wide-angle end in Embodiment 1.
Figure 2B:
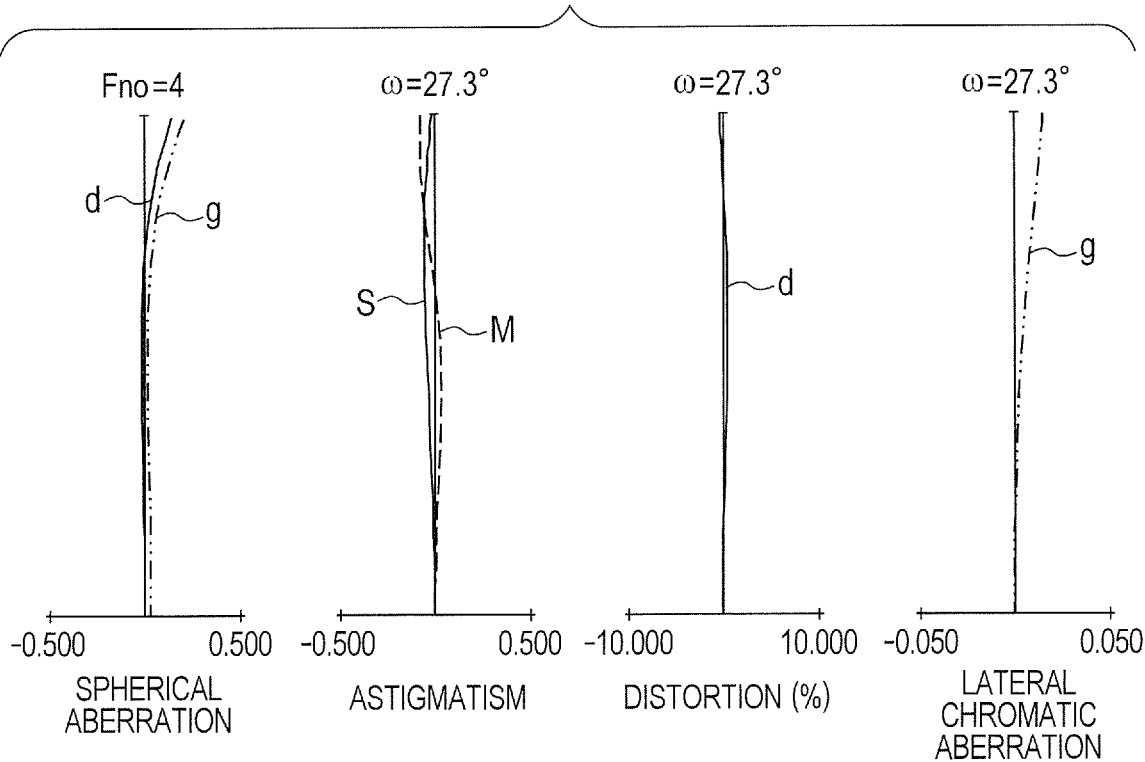
FIG. 2B is an aberration diagram of the zoom lens at a zoom position in the middle in Embodiment 1.
Figure 2C:
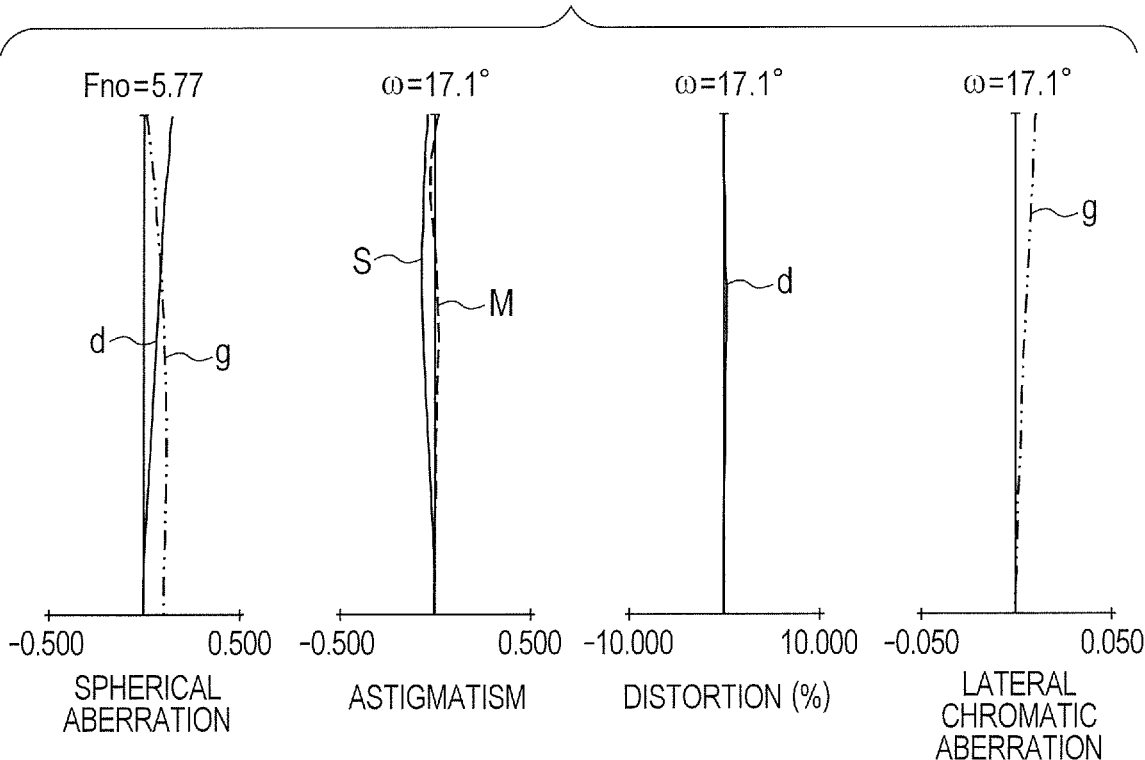
FIG. 2C is an aberration diagram of the zoom lens at a telephoto end in Embodiment 1.

FIG. 1 is a cross-sectional view of a zoom lens at a wide-angle end (short focal length end) in Embodiment 1. FIGS. 2A, 2B and 2C are aberration diagrams of the zoom lens at the wide-angle end, a zoom position in the middle, and the telephoto end (long focal length end) in Embodiment 1, respectively. Embodiment 1 is the zoom lens having a zoom ratio of 2.83 and an f-number of approximately 2.88 to 5.77.

Figure 3:
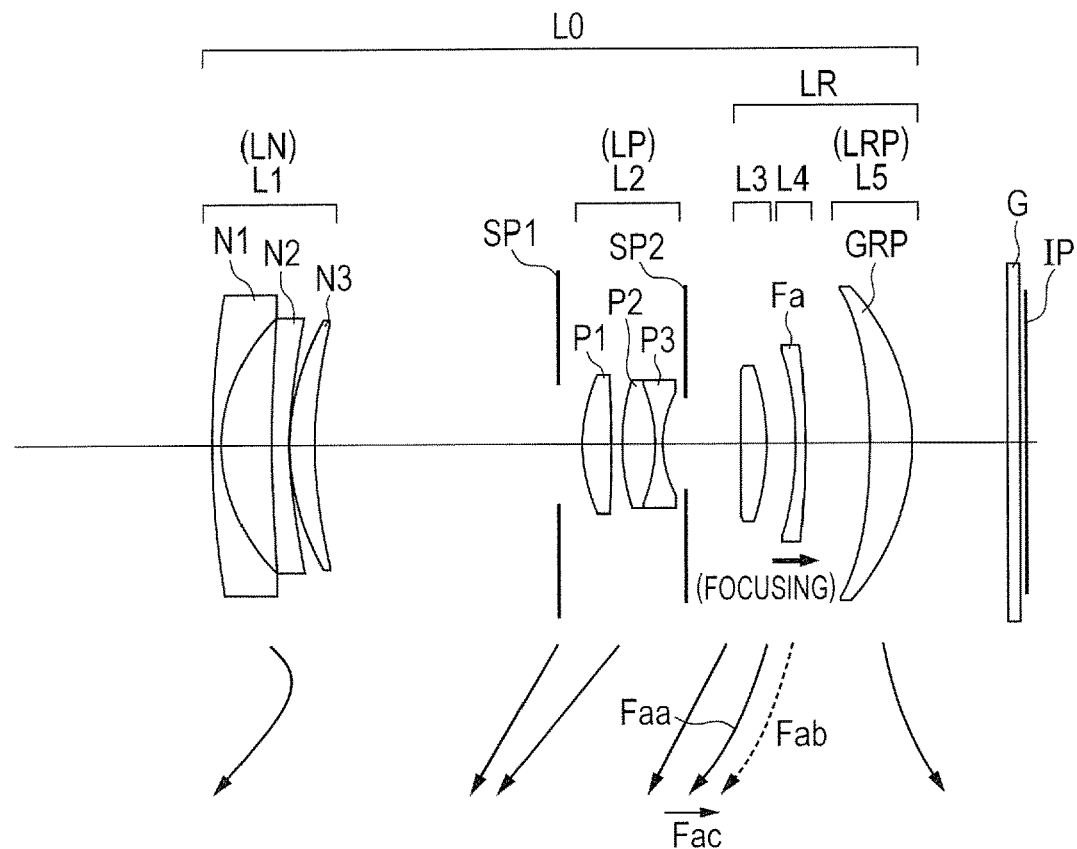
FIG. 3 is a cross-sectional view of a zoom lens at the wide-angle end in Embodiment 2.
Figure 4A:
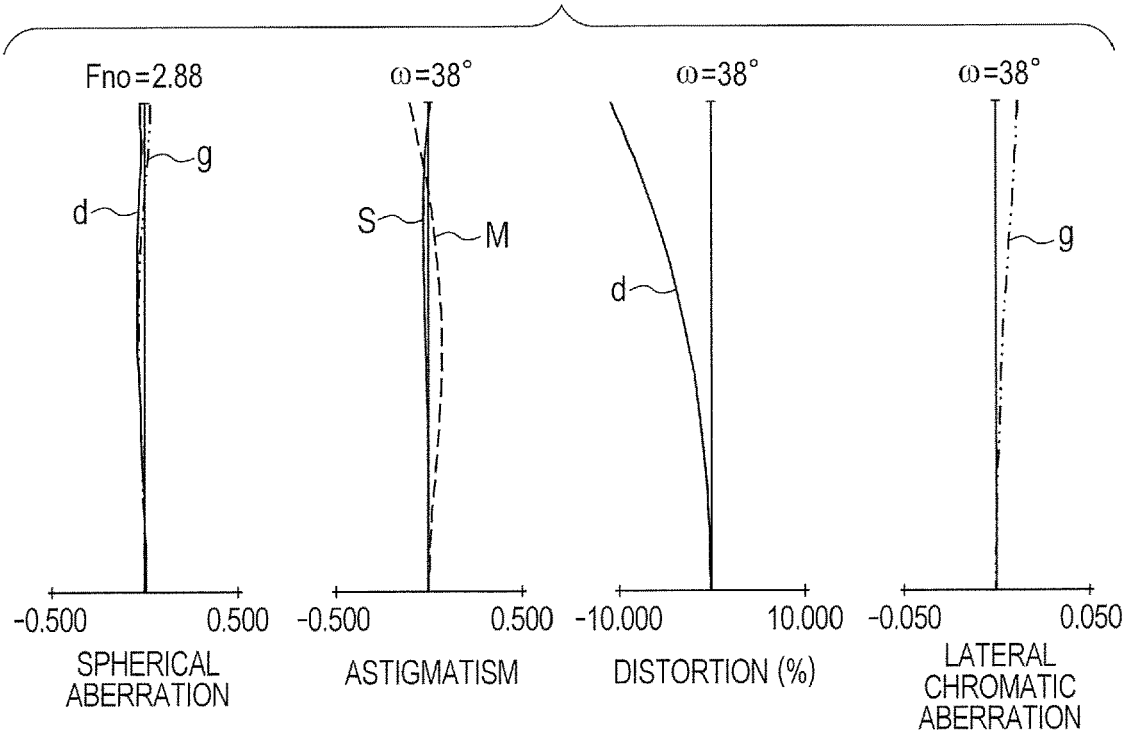
FIG. 4A is an aberration diagram of the zoom lens at the wide-angle end in Embodiment 2.
Figure 4B:
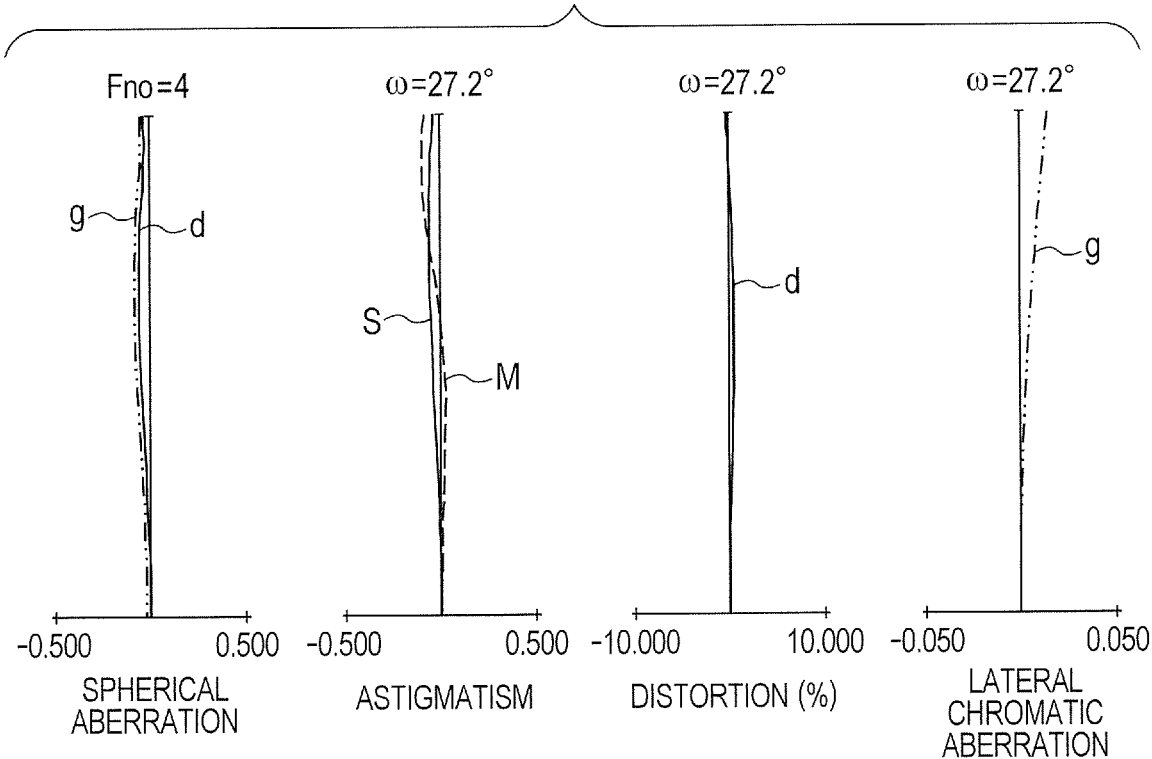
FIG. 4B is an aberration diagram of the zoom lens at a zoom position in the middle in Embodiment 2.
Figure 4C:
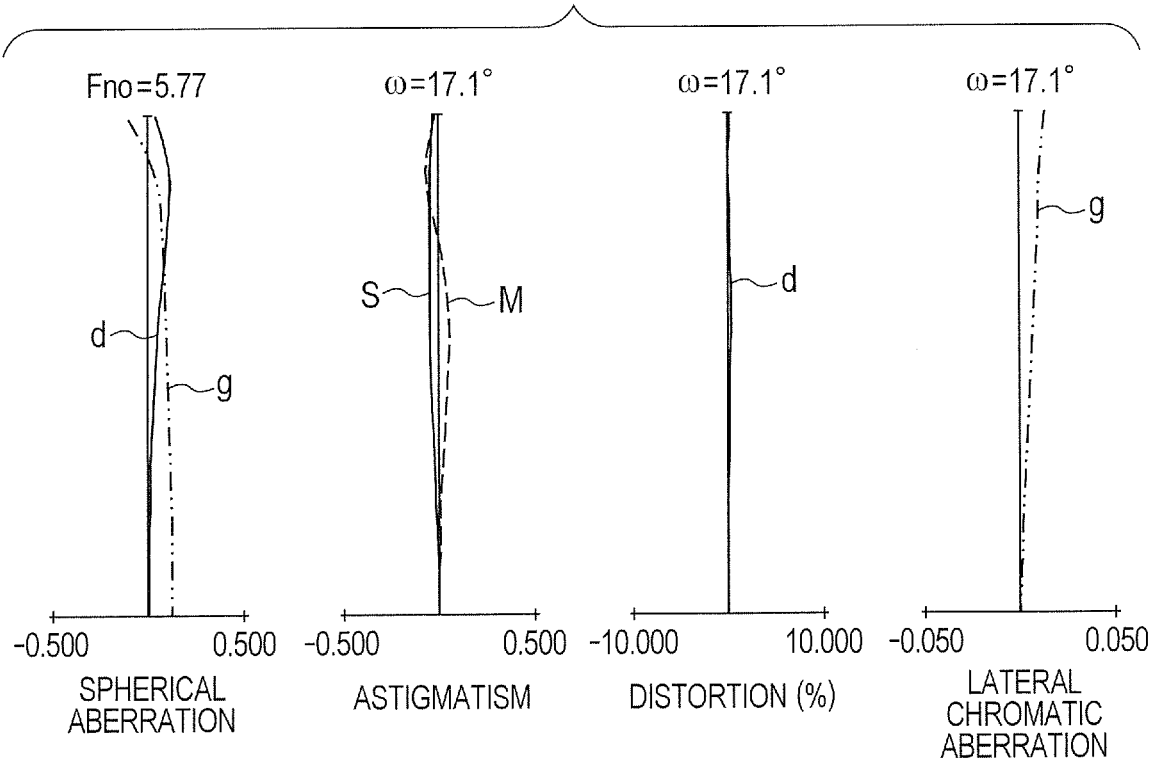
FIG. 4C is an aberration diagram of the zoom lens at the telephoto end in Embodiment 2.

FIG. 3 is a cross-sectional view of a zoom lens at the wide-angle end in Embodiment 2. FIGS. 4A, 4B and 4C are aberration diagrams of the zoom lens at the wide-angle end, a zoom position in the middle, and the telephoto end in Embodiment 2, respectively. Embodiment 2 is the zoom lens having a zoom ratio of 2.83 and an f-number of approximately 2.88 to 5.77.

Figure 5:
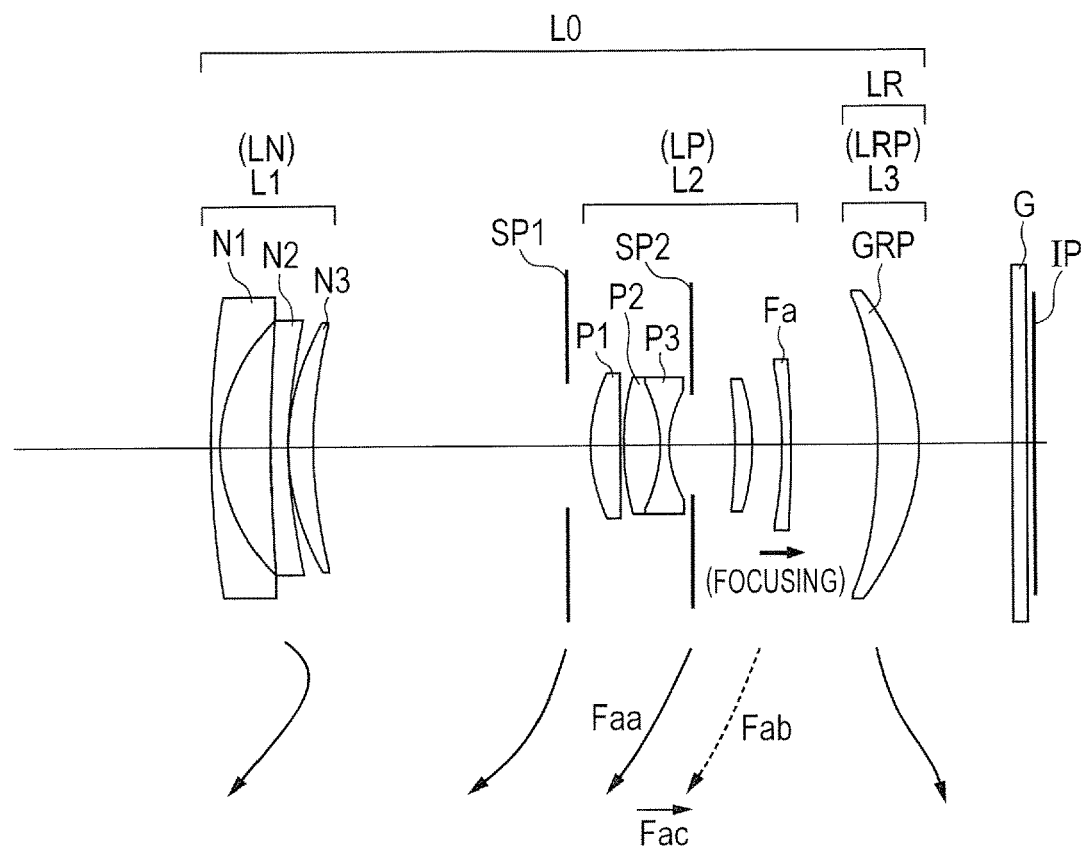
FIG. 5 is a cross-sectional view of a zoom lens at the wide-angle end in Embodiment 3.
Figure 6A:
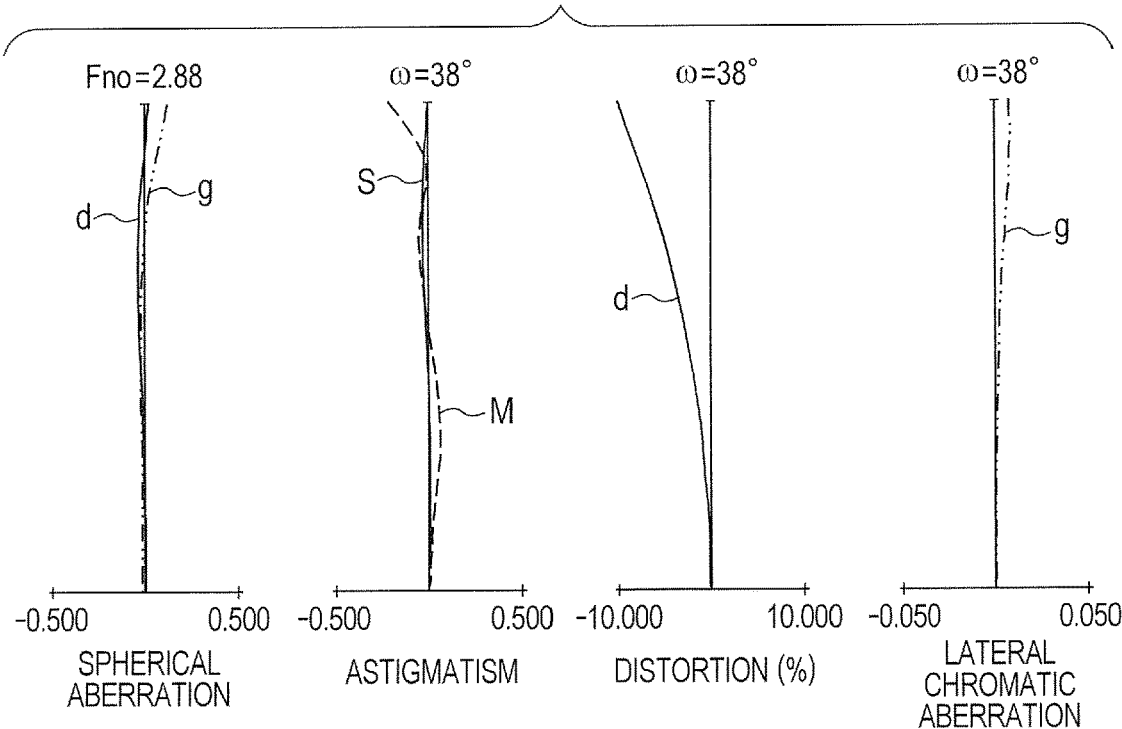
FIG. 6A is an aberration diagram of the zoom lens at the wide-angle end in Embodiment 3.
Figure 6B:
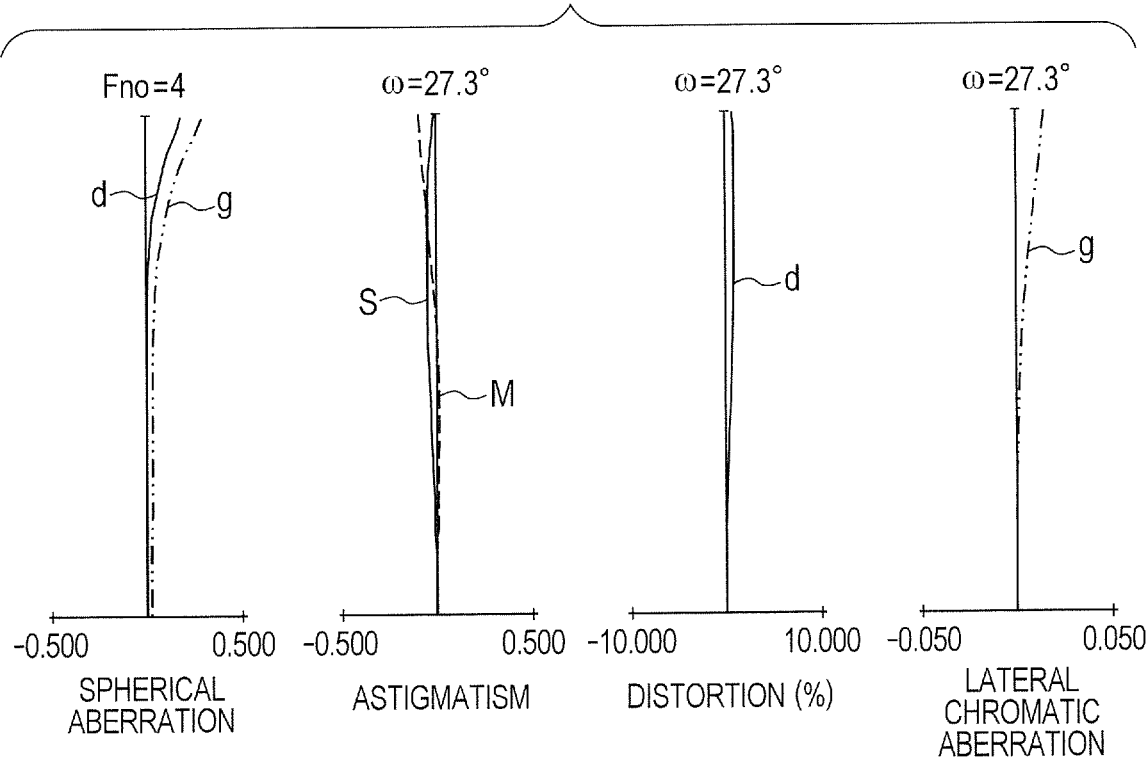
FIG. 6B is an aberration diagram of the zoom lens at a zoom position in the middle in Embodiment 3.
Figure 6C:
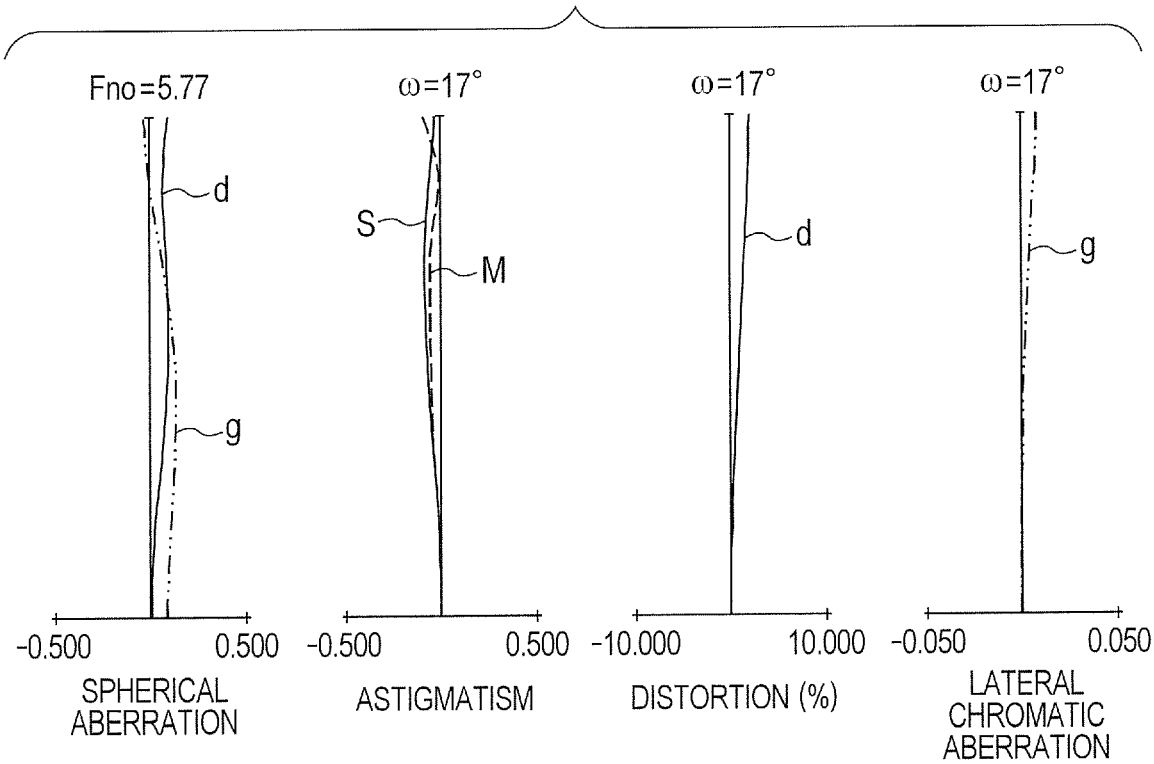
FIG. 6C is an aberration diagram of the zoom lens at the telephoto end in Embodiment 3.

FIG. 5 is a cross-sectional view of a zoom lens at the wide-angle end in Embodiment 3. FIGS. 6A, 6B and 6C are aberration diagrams of the zoom lens at the wide-angle end, a zoom position in the middle, and the telephoto end in Embodiment 3, respectively. Embodiment 3 is the zoom lens having a zoom ratio of 2.85 and an f-number of approximately 2.88 to 5.77.

Figure 7:
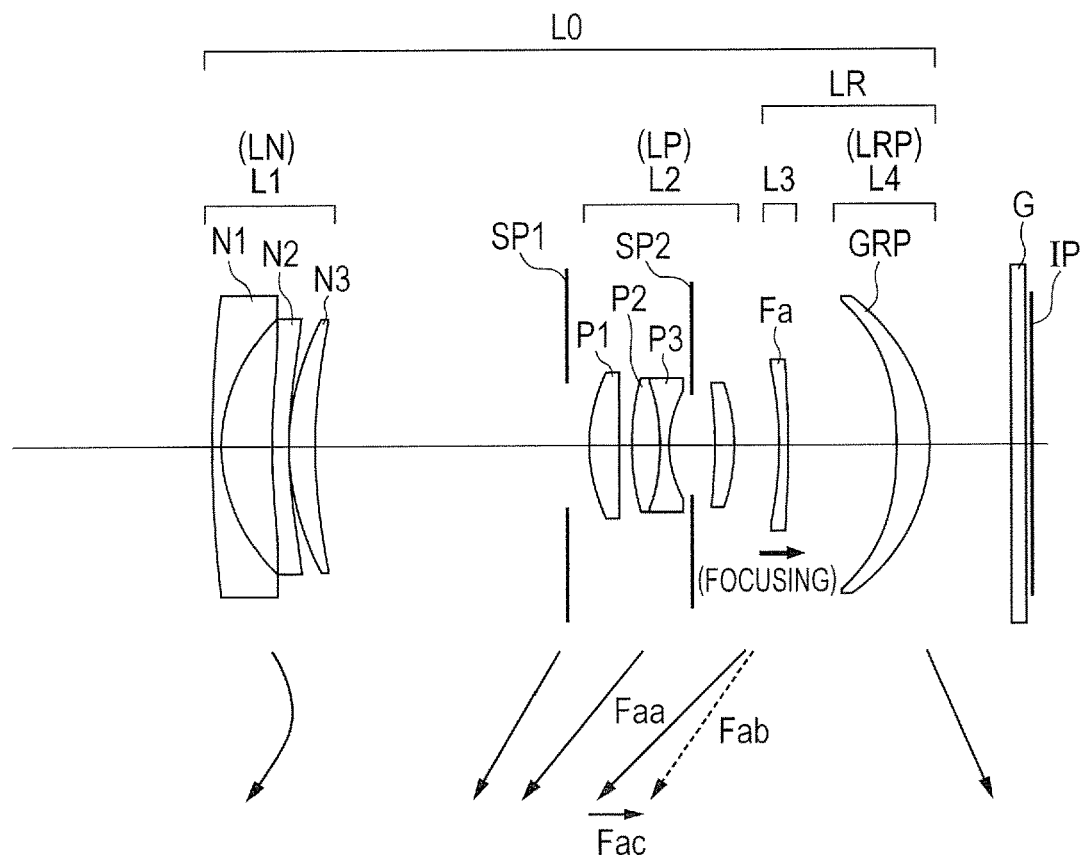
FIG. 7 is a cross-sectional view of a zoom lens at the wide-angle end in Embodiment 4.
Figure 8A:
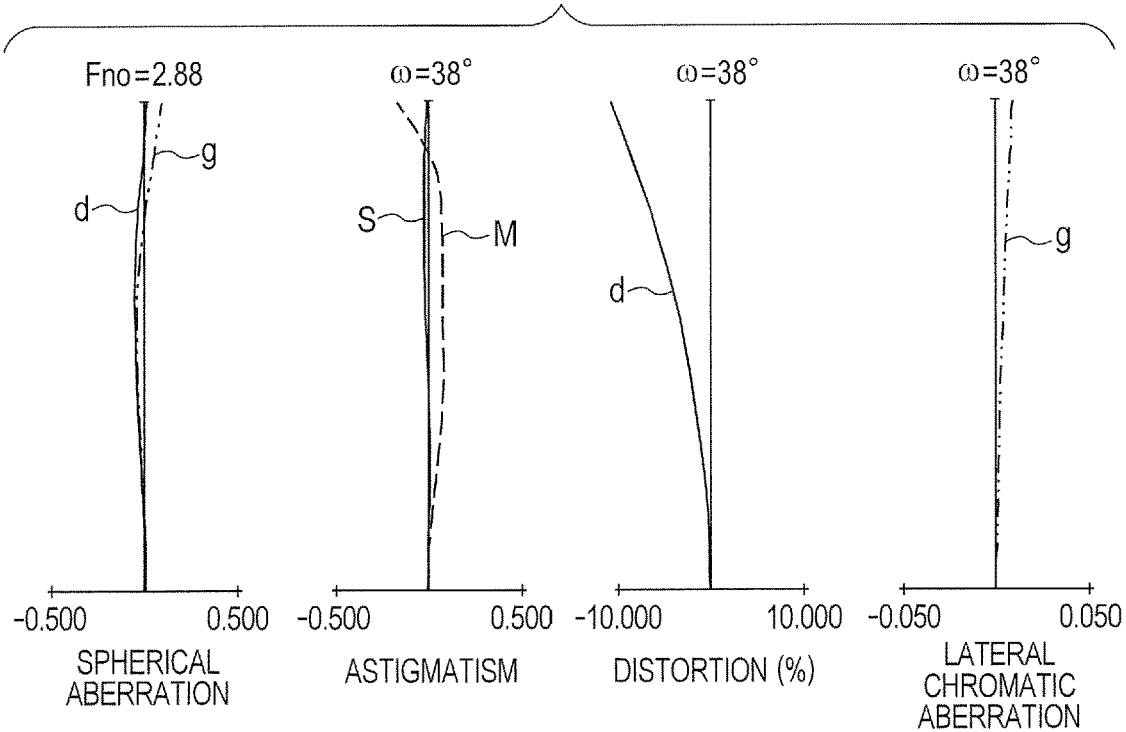
FIG. 8A is an aberration diagram of the zoom lens at the wide-angle end in Embodiment 4.
Figure 8B:
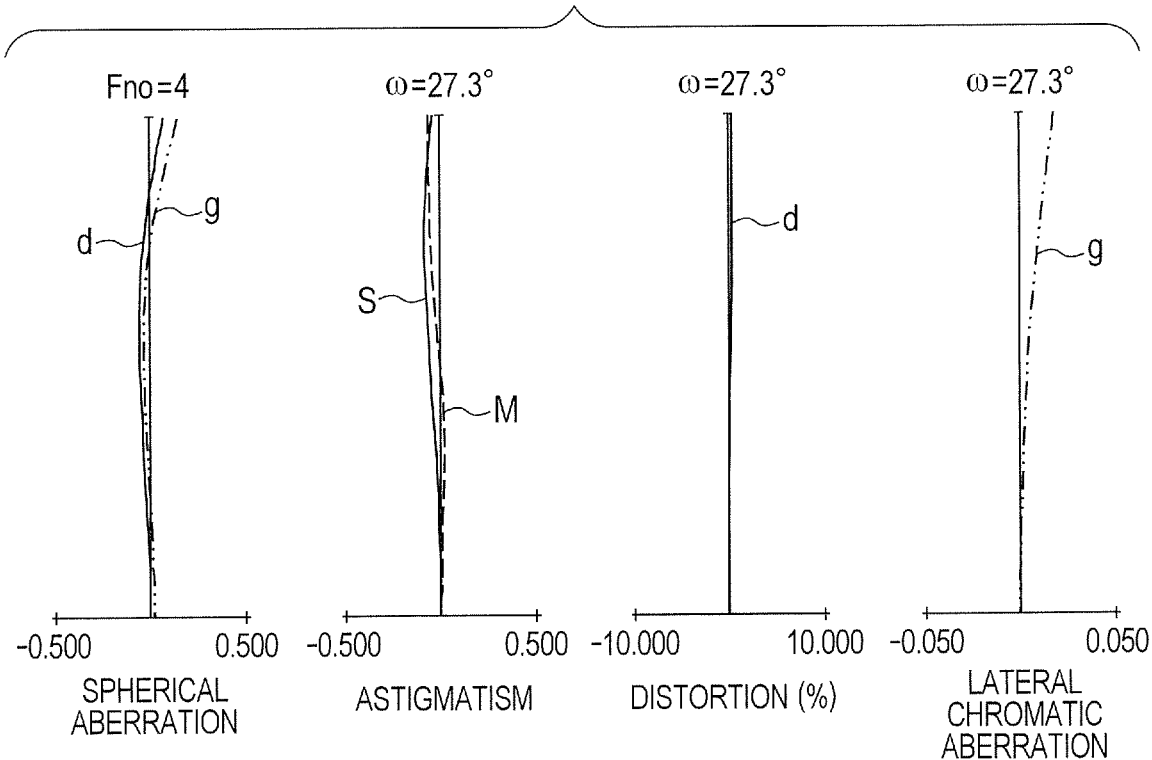
FIG. 8B is an aberration diagram of the zoom lens at a zoom position in the middle in Embodiment 4.
Figure 8C:
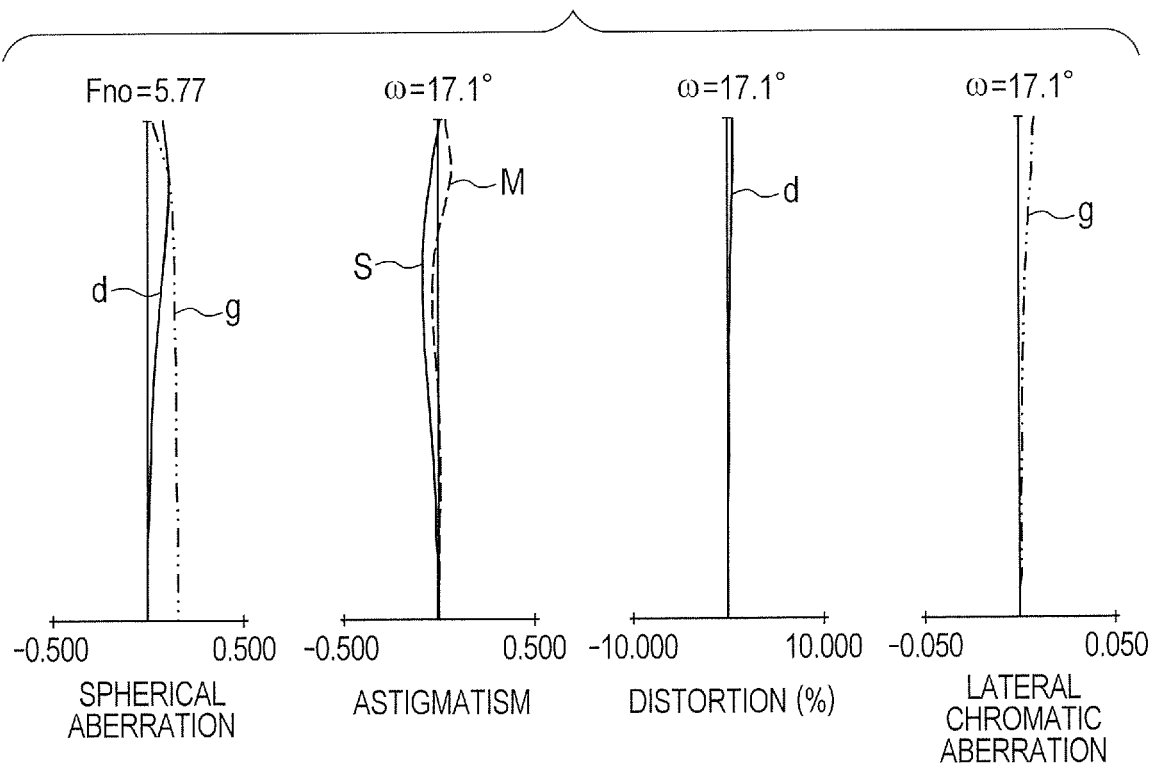
FIG. 8C is an aberration diagram of the zoom lens at the telephoto end in Embodiment 4.

FIG. 7 is a cross-sectional view of a zoom lens at the wide-angle end in Embodiment 4. FIGS. 8A, 8B and 8C are aberration diagrams of the zoom lens at the wide-angle end, a zoom position in the middle, and the telephoto end in Embodiment 4, respectively. Embodiment 4 is the zoom lens having a zoom ratio of 2.83 and an f-number of approximately 2.88 to 5.77.

Figure 9:
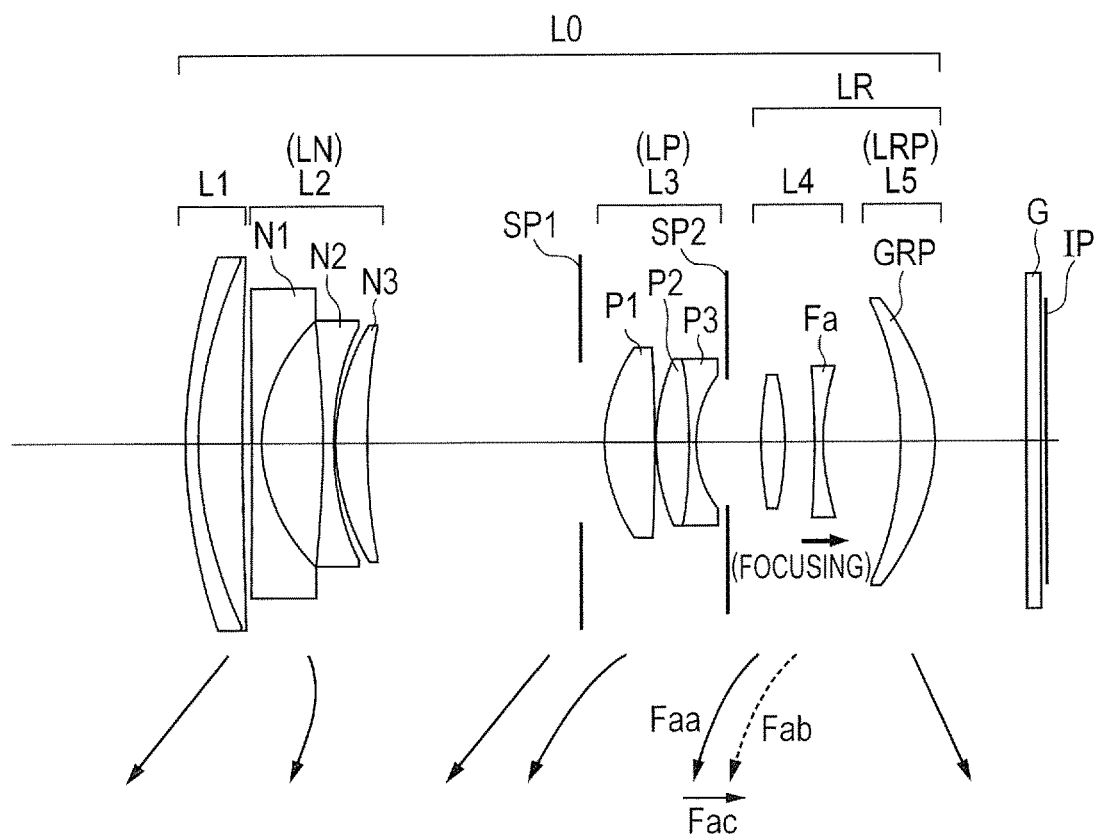
FIG. 9 is a cross-sectional view of a zoom lens at the wide-angle end in Embodiment 5.
Figure 10A:
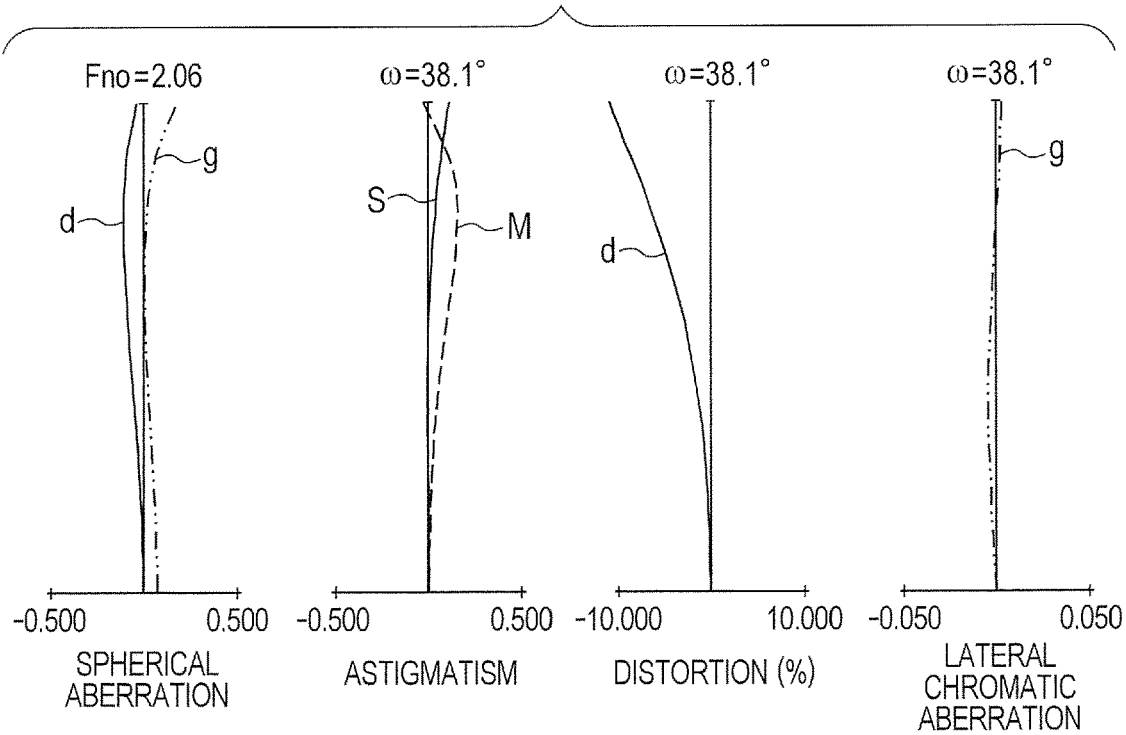
FIG. 10A is an aberration diagram of the zoom lens at the wide-angle end in Embodiment 5.
Figure 10B:
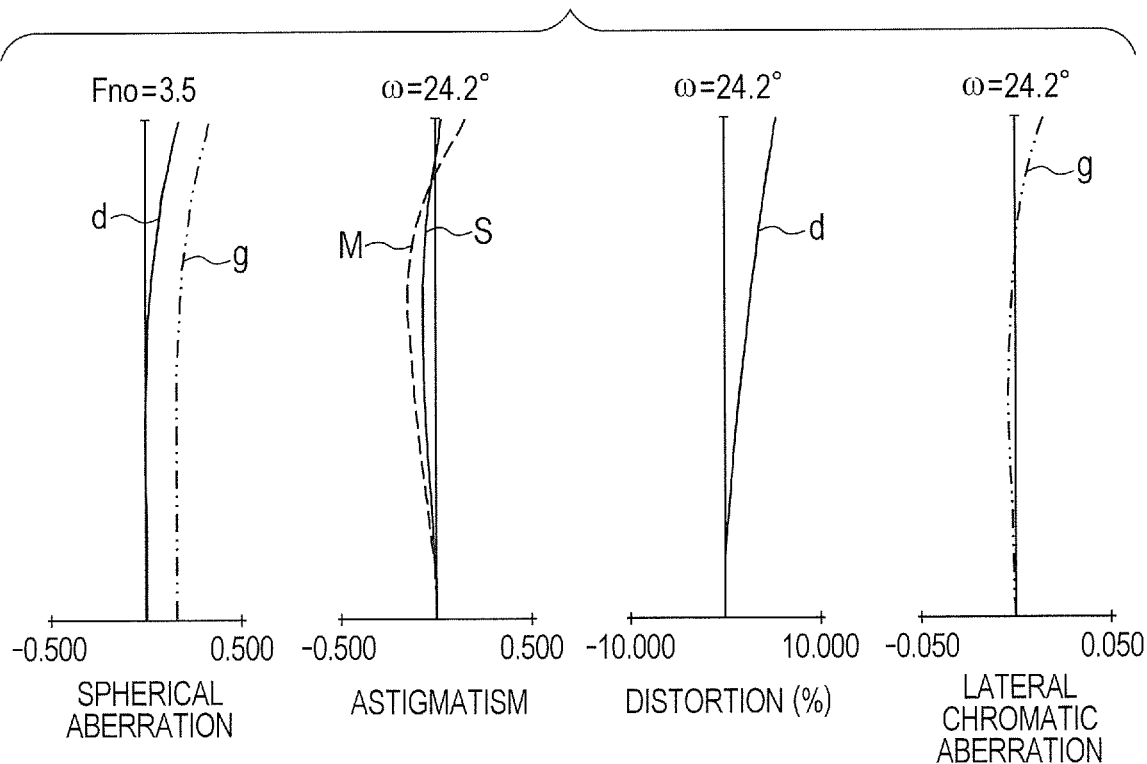
FIG. 10B is an aberration diagram of the zoom lens at a zoom position in the middle in Embodiment 5.
Figure 10C:
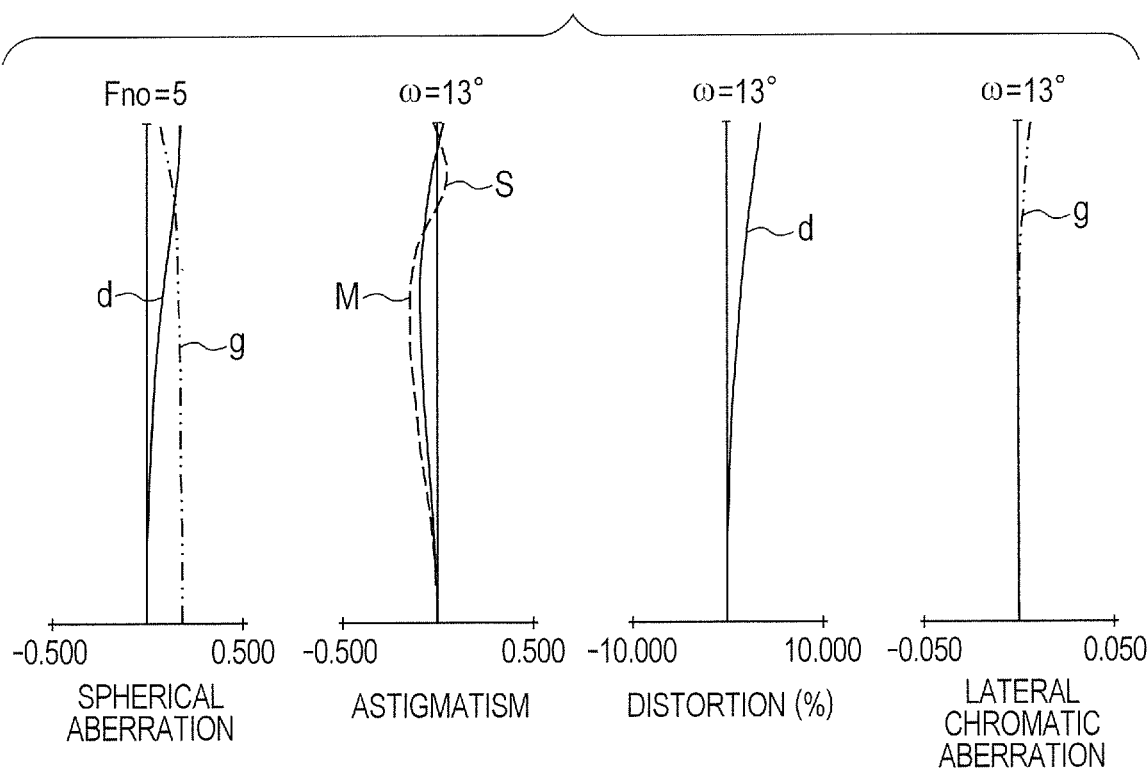
FIG. 10C is an aberration diagram of the zoom lens at the telephoto end in Embodiment 5.

FIG. 9 is a cross-sectional view of a zoom lens at the wide-angle end in Embodiment 5. FIGS. 10A, 10B and 10C are aberration diagrams of the zoom lens at the wide-angle end, a zoom position in the middle, and the telephoto end in Embodiment 5, respectively. Embodiment 5 is the zoom lens having a zoom ratio of 3.77 and an f-number of approximately 2.06 to 5.00.

Figure 11:
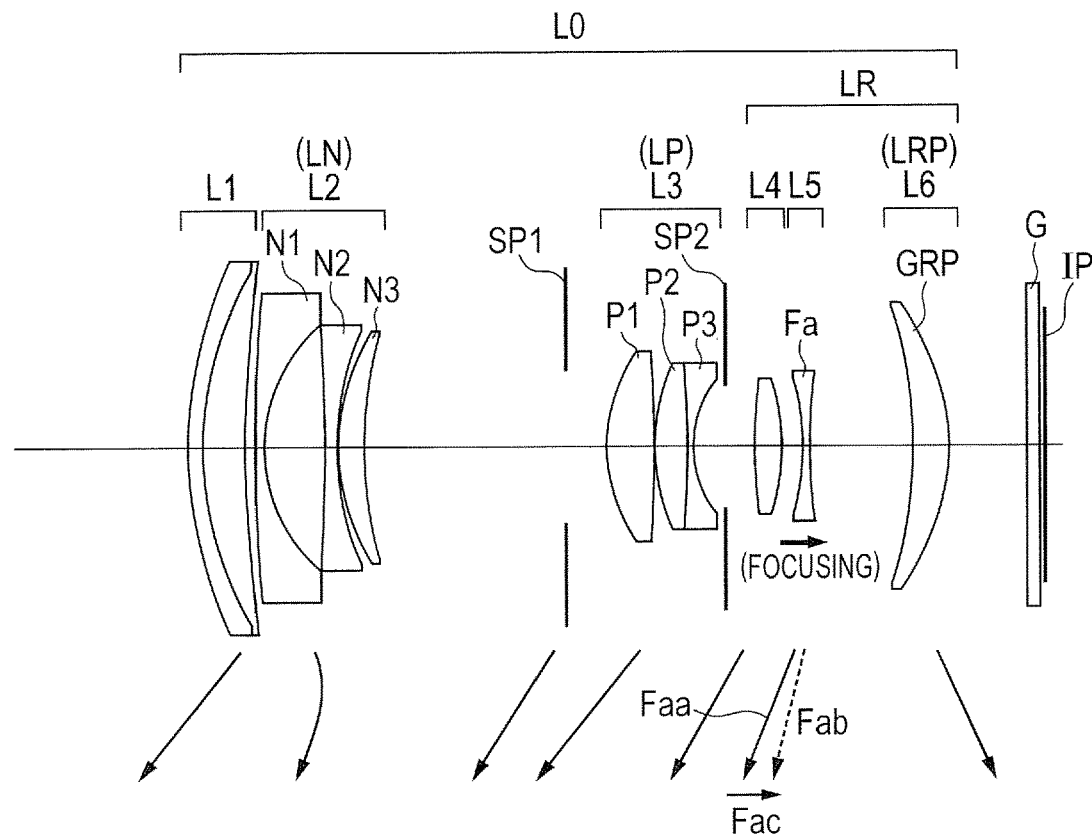
FIG. 11 is a cross-sectional view of a zoom lens at the wide-angle end in Embodiment 6.
Figure 12A:
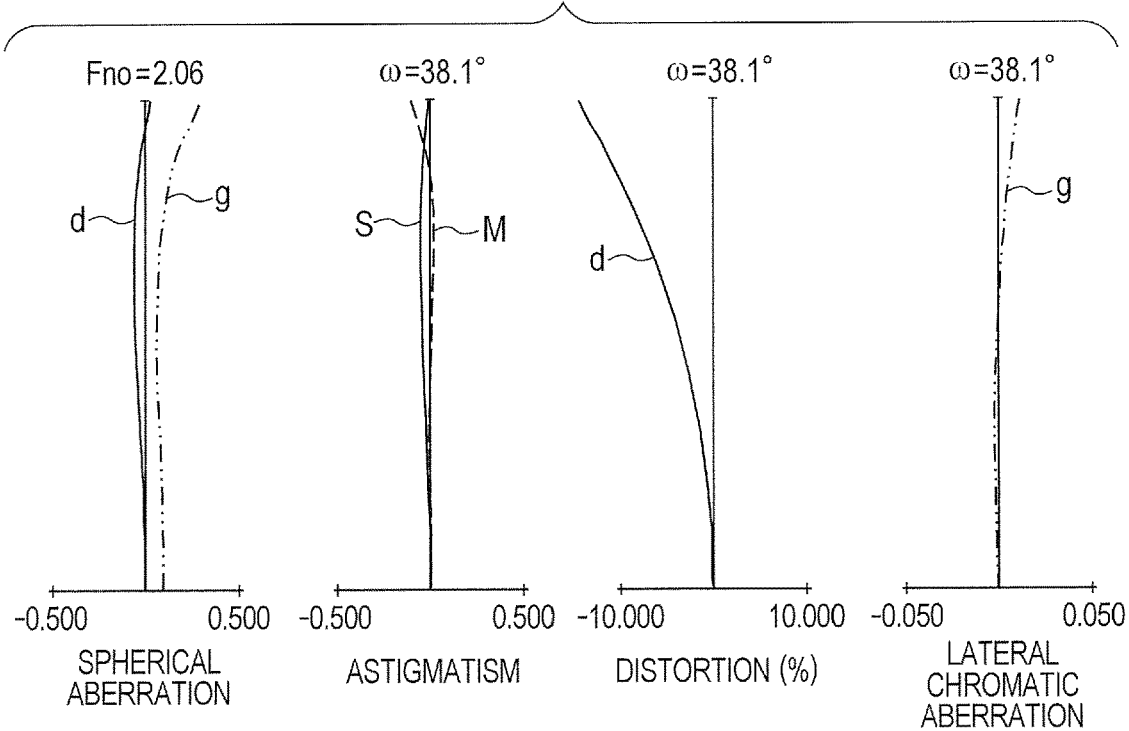
FIG. 12A is an aberration diagram of the zoom lens at the wide-angle end in Embodiment 6.
Figure 12B:
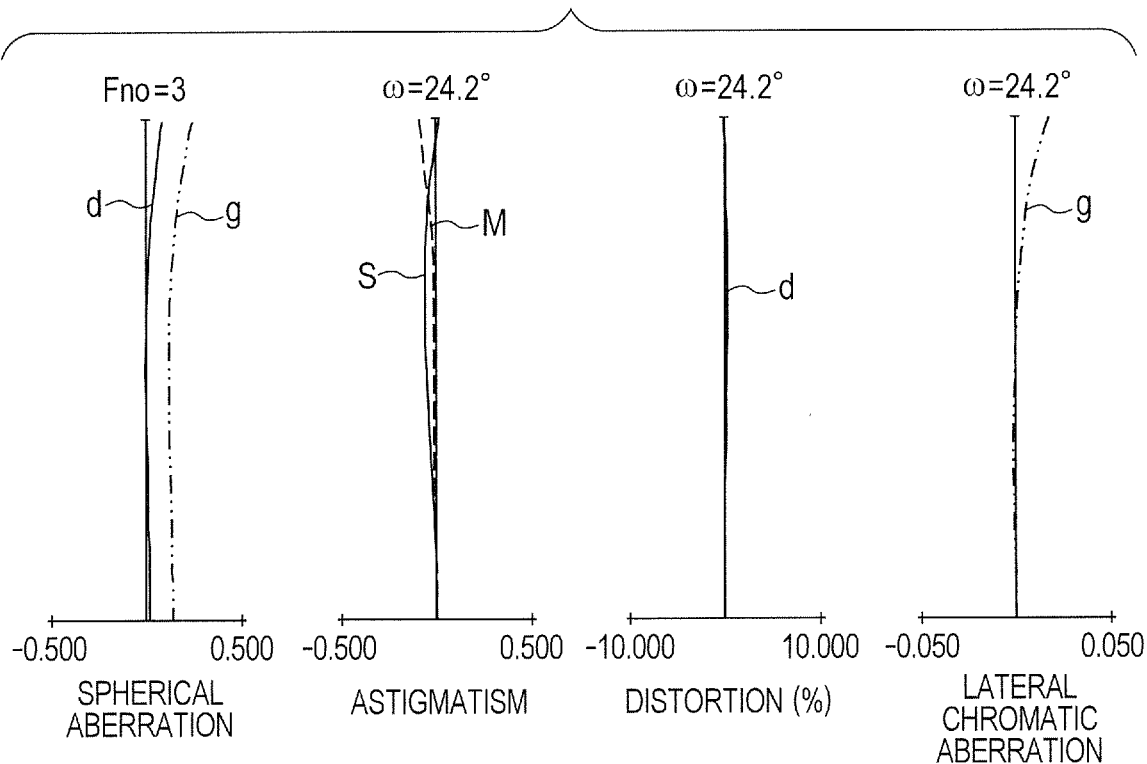
FIG. 12B is an aberration diagram of the zoom lens at a zoom position in the middle in Embodiment 6.
Figure 12C:
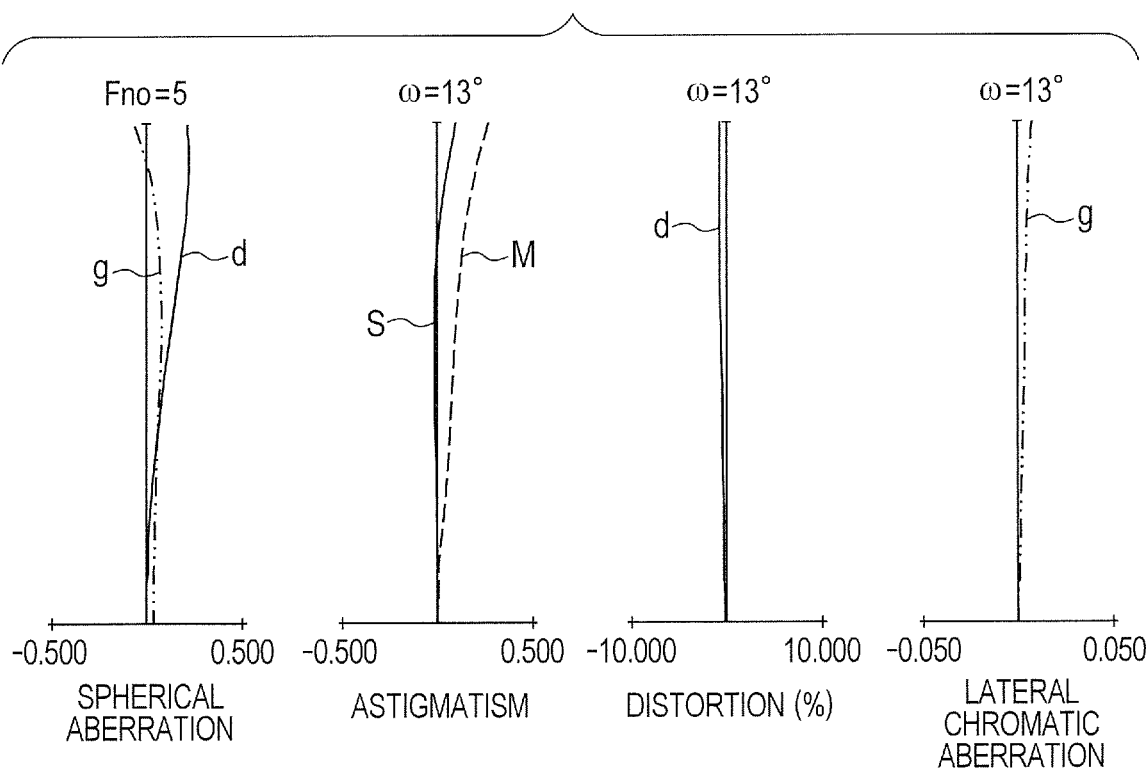
FIG. 12C is an aberration diagram of the zoom lens at the wide-angle end in Embodiment 6.

FIG. 11 is a cross-sectional view of a zoom lens at the wide-angle end in Embodiment 6. FIGS. 12A, 12B and 12C are aberration diagrams of the zoom lens at the wide-angle end, a zoom position in the middle, and the telephoto end in Embodiment 6, respectively. Example 6 is the zoom lens having a zoom ratio of 3.76 and an f-number of approximately 2.06 to 5.00.

Figure 13:
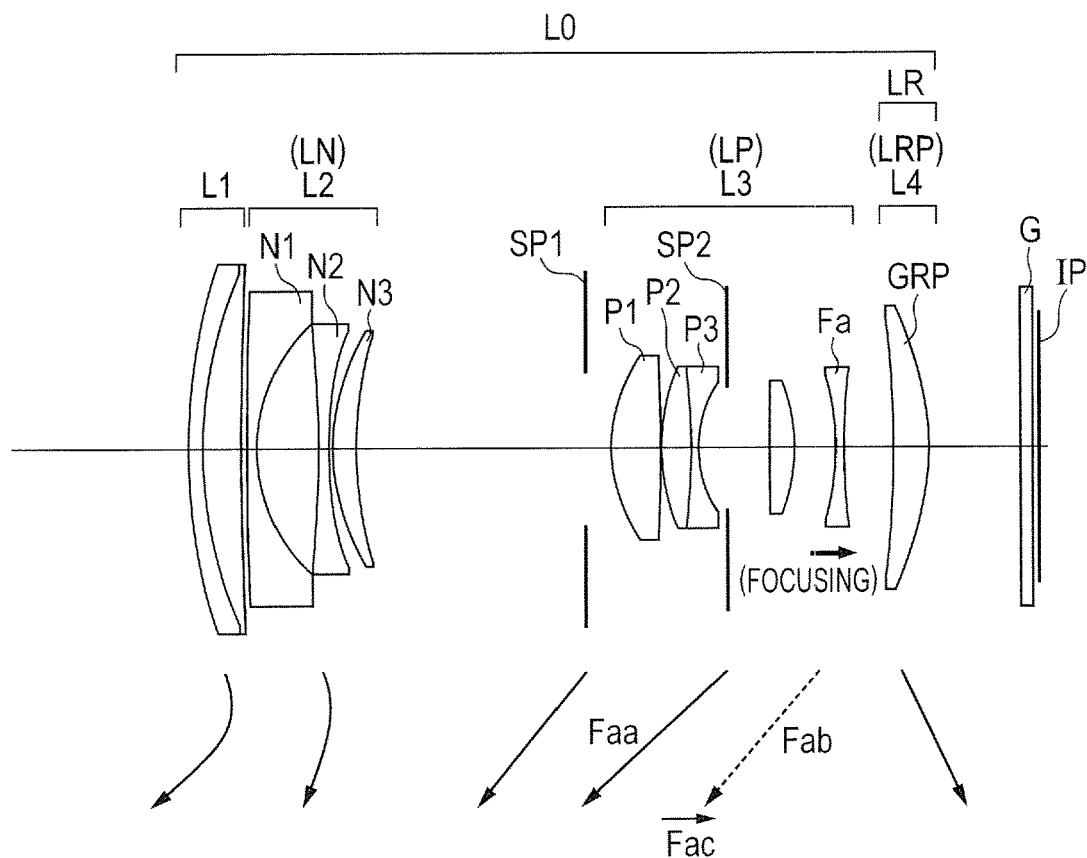
FIG. 13 is a cross-sectional view of a zoom lens at the wide-angle end in Embodiment 7.
Figure 14A:
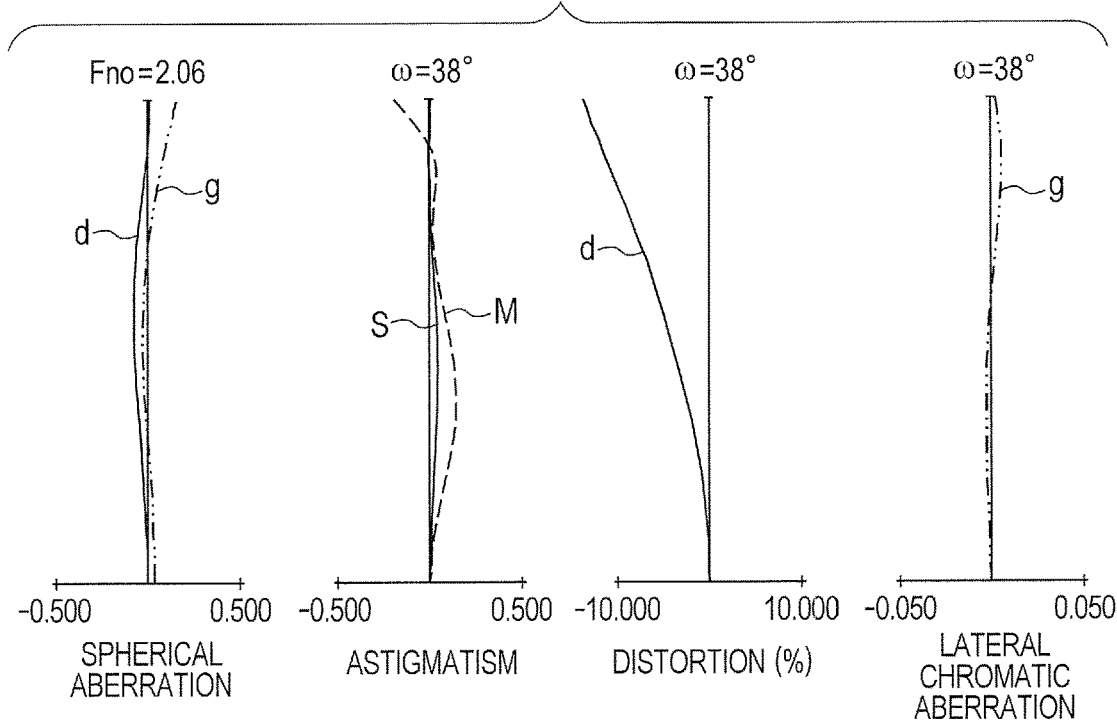
FIG. 14A is an aberration diagram of the zoom lens at the wide-angle end in Embodiment 7.
Figure 14B:
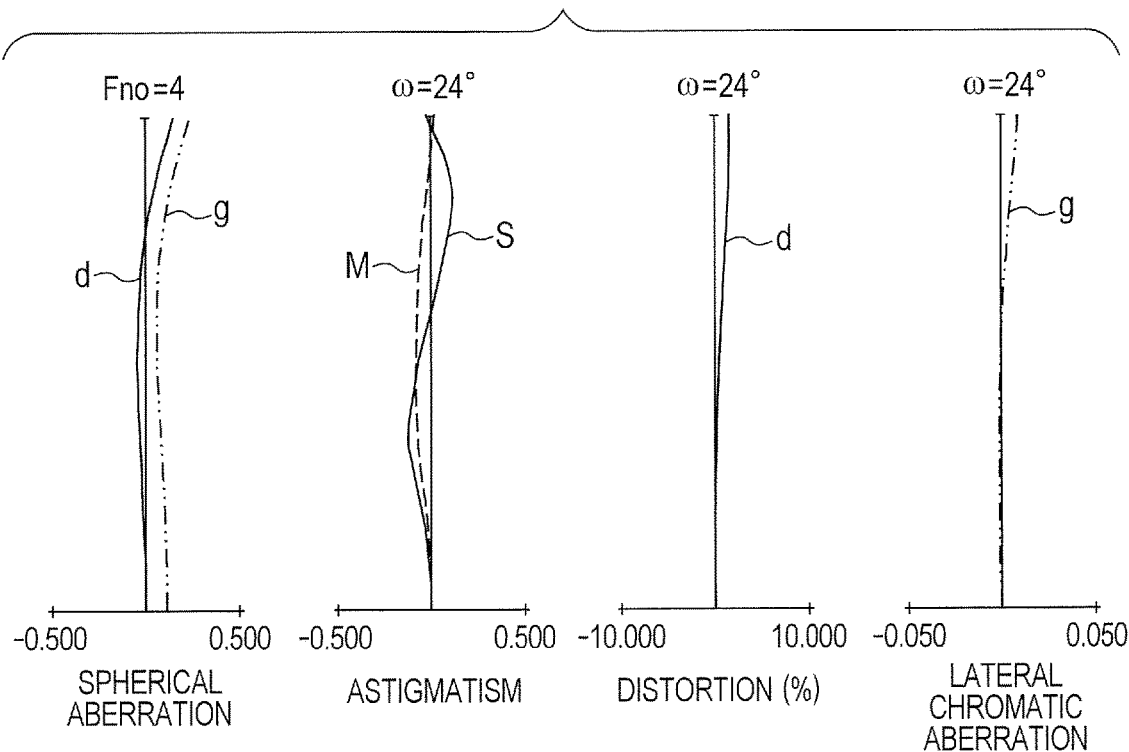
FIG. 14B is an aberration diagram of the zoom lens at a zoom position in the middle in Embodiment 7.
Figure 14C:
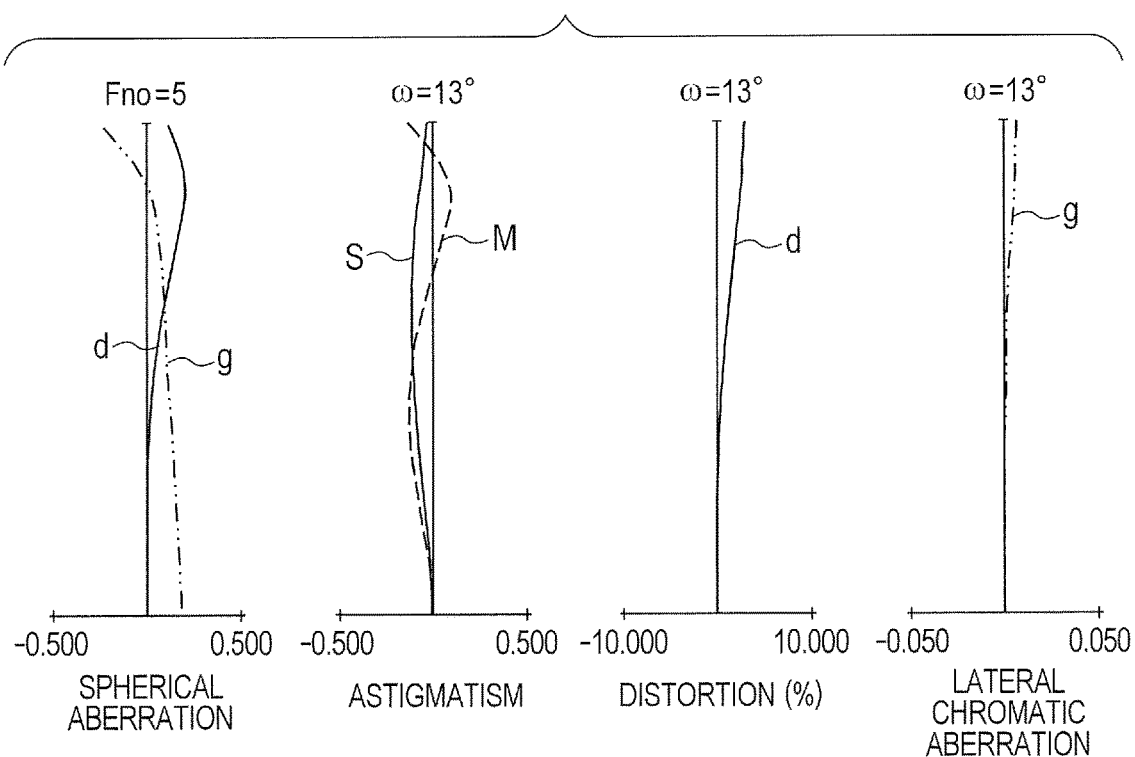
FIG. 14C is an aberration diagram of the zoom lens at the wide-angle end in Embodiment 7.

FIG. 13 is a cross-sectional view of the zoom lens at the wide-angle end in Embodiment 7. FIGS. 14A, 14B and 14C are aberration diagrams of the zoom lens at the wide-angle end, a zoom position in the middle, and the telephoto end in Embodiment 7, respectively. Embodiment 7 is the zoom lens having a zoom ratio of 3.75 and an f-number of approximately 2.06 to 5.00.

Figure 15A:
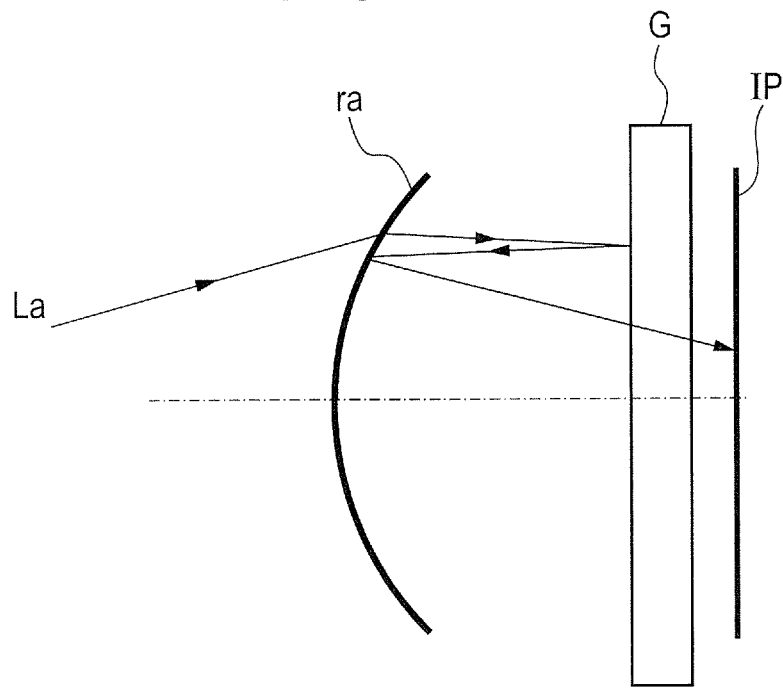
FIG. 15A is a view for describing the occurrence of a ghost.
Figure 15B:
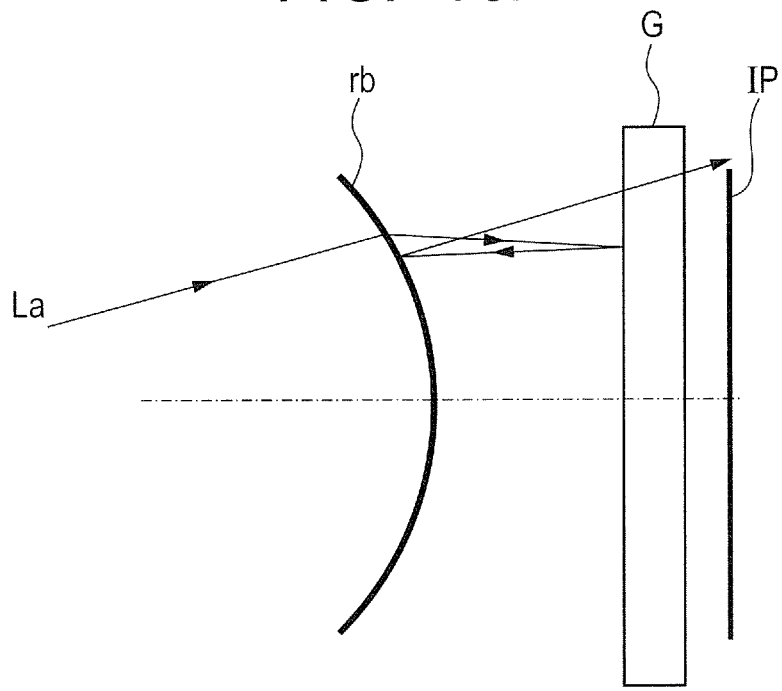
FIG. 15B is a view for describing the occurrence of the ghost.
Figure 17:
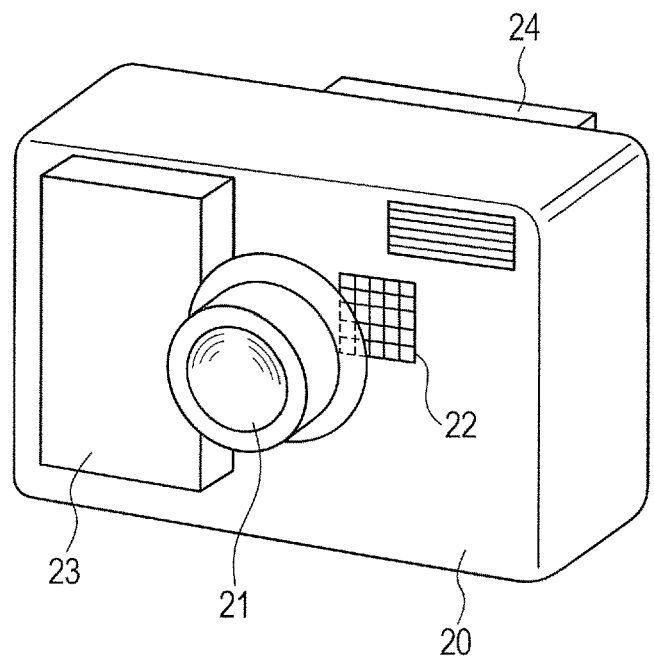
FIG. 17 is a schematic view of essential parts of an image pickup apparatus in the present invention.

FIGS. 15A and 15B are views for describing a ghost which originates in the lens in the side closest to the image. FIG. 17 is a schematic view of essential parts of an image pickup apparatus in the present invention.

The zoom lens in each of the embodiments is an imaging optical system which is used in an image pickup apparatus such as a video camera, a digital camera, a monitoring camera and a silver halide film camera.

In the cross-sectional view of the zoom lens, the left side is an object side (front side), and the right side is an image side (rear side). In addition, a zoom lens LO is illustrated in the cross-sectional views. In addition, if reference character i is defined to be the order of the lens unit from the object side, a lens unit Li represents an i-th lens unit. There are shown a lens unit LN having a negative refractive power, a lens unit LP having a positive refractive power, and a rear lens group (final lens unit) LR which includes one or more lens units. A lens unit LRP is shown which is arranged on the side closest to the image in the lens unit LR and has a positive refractive power. A positive lens GRP is shown that constitutes the lens unit LRP, is made from a resin and has a meniscus shape of which the convex surface faces the image side.

An aperture stop SP1 is shown. A flare cut stop SP2 is shown. An image plane IP is shown. When the zoom lens is used as an image pickup optical system of a digital camera, a video camera and a monitoring camera, the image plane IP corresponds to the image plane of an image pickup device (photoelectric conversion element) such as a CCD sensor and a CMOS sensor. When the zoom lens is used as the image pickup optical system of the silver halide film camera, the image plane IP also corresponds to a film surface.

Incidentally, in each of the following embodiments, the wide-angle end and the telephoto end mean zoom positions at the time when lens units for zooming are positioned on both ends of a range in which the lens units can mechanically move on the optical axis. In the cross-sectional view of the zoom lens, each arrow indicates a movement locus of each of the lens units, at the time of zooming from the wide-angle end to the telephoto end.

An arrow concerning the focus indicates a moving direction of the lens unit during focusing from infinity to a short distance. In the spherical aberration diagram, a solid line d shows the d line (587.6 nm), and a broken line g shows the g line (435.8 nm). In addition, in the view illustrating the astigmatism, the solid line S shows a sagittal direction of the d-line, and the broken line M shows a meridional direction of the d-line. In addition, the view illustrating distortion shows the distortion in the d line. There are shown the F number Fno, and a half angle of view ω (degree) of a photographing angle of view.

In the zoom lens of the present embodiment, a configuration will be described below by which a zoom lens having the whole compact system and high optical performance can be obtained.

In each of the embodiments, a focal length of a whole system at a wide-angle end shall be represented by fW, a back focus at a telephoto end shall be represented by BkT, a focal length of the lens unit LRP shall be represented by fRP, an amount of movement of the lens unit LRP at the time of zooming from the wide-angle end to the telephoto end shall be represented by mRP. A focal length of the lens unit LP shall be represented by fLP, a thickness of the positive lens GRP on the optical axis shall be represented by DGRP, a distance in the optical axis direction between the lens center on a lens surface on an object side of the positive lens GRP and an end of an effective surface of the lens surface on the object side shall be represented by R1sag.

At this time, the above values satisfy the following conditional expressions:

$$0.15 < BkT/fW < 0.50 \tag{1}$$

$$8.0 < fRP/mRP < 50.0 \tag{2}$$

$$1.40 < fRP/fLP < 3.50 \tag{3, and}$$

$$-3.00 < R1sag/DGRP < -0.15 \tag{4}$$

Here, the amount of movement means a difference between positions of the lens units on the optical axis at the wide-angle end and the telephoto end; and the sign of the amount of movement is determined to be a minus number when the lens unit is positioned at a side closer to an object at the telephoto end compared to the wide-angle end, and be a plus number when the lens unit is positioned at a side closer to the image. First, the reason will be described below why when the lens is arranged in the vicinity of the image pickup device (sensor) in the zoom lens according to the present invention, the ghosts originating in reflection from the lens surface occur on a face of which the concave surface faces the image side, in many cases.

FIGS. 15A and 15B are explanatory views for describing the occurrence of the ghost. FIG. 15A is an explanatory view of a path of the ghost when a lens system including the concave surface ra is arranged toward an image plane IP side. In FIG. 15A, a light beam La reflects on the surface of the cover glass of the image pickup device or the surface of the optical filter G, and the reflected light beam La is reflected by the surface ra again and is incident on the image plane IP to become a harmful ghost. The surface ra aims the concave surface at the image plane IP side, and accordingly results in having such a configuration as to easily gather the light into the vicinity of the center of the image plane IP.

On the other hand, as is illustrated in FIG. 15B, in the case of the lens surface of which the convex surface rb faces the image plane IP, the light beam reflects on the cover glass of the image pickup device or the optical filter G and reflects on the rb again, and then the ghost ray is incident on a place in the peripheral direction of the image plane IP. Therefore, the light beam does not become the ghost. When the material of the lens is a resin, in the configuration in which the concave surface faces the image side, the reflected light increases compared to the case where the lens is made of lens glass, and the ghost having a strong strength occurs. Then, in the zoom lens in the present invention, the lens that has a meniscus shape of which the convex surface faces the image side is arranged in the vicinity of the image pickup device, and thereby reduces the occurrence of the ghost originating in the reflection on each of the lens surfaces.

Figure 16:
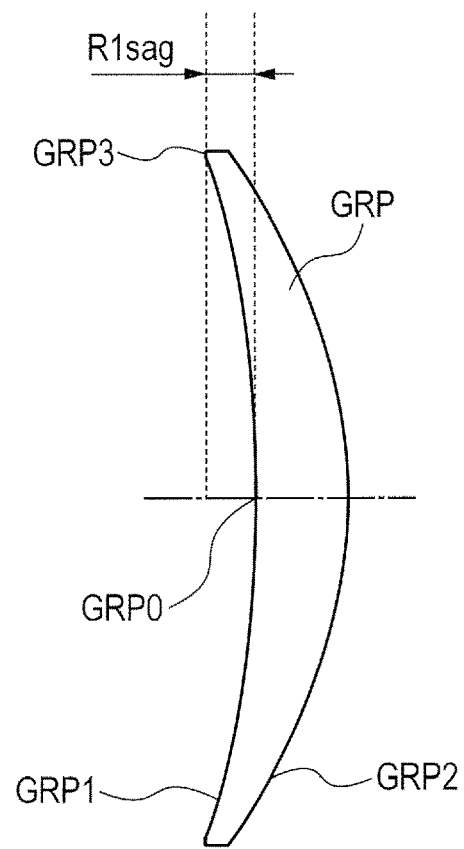
FIG. 16 is a view for describing R1sag.

Next, the definition of the distance R1sag that is a parameter will be described below with reference to FIG. 16. The distance R1sag is a so-called sagittal amount. As is illustrated in FIG. 16, the distance R1sag is a distance in the optical axis direction between the lens center GRP0 on the lens surface GRP1 on the object side of the positive lens GRP and the end GRP3 on the effective diameter of the lens surface GRP1. The sign of the distance R1sag is determined to be a plus number when the distance has been measured from the lens center GRP0 toward the image side, and be a minus number when the distance has been measured toward the object side.

Next, the technical meaning of each of the previously described conditional expressions will be described below. Conditional expression (1) defines the back focus at the telephoto end. If the back focus becomes too long to exceed the upper limit of the conditional expression (1), the amount of movement of the lens unit LRP at the time of zooming results in decreasing, and the zooming share of the lens unit LRP decreases.

Therefore, the lens units existing at sides closer to the object than the lens unit LRP become necessary to increase the amount of movement and/or shorten the focuses of lens units, the number of lenses increases, and it becomes difficult to reduce the size of the whole system. In addition, the distance between the lens unit LRP and the sensor (image pickup device) increases, thereby a luminous flux passing through the lens unit LRP becomes thick, and accordingly fluctuation in the optical performance due to the dispersion in the shape of the lens surface becomes large, which originates in a manufacturing error, which is not desirable.

If the back focus becomes too short to exceed the lower limit of the conditional expression (1), the fluctuation in the optical performance originating in the manufacturing error tends to decrease, but the lens unit becomes easy to interfere with the cover glass of the sensor and the optical filter, and the way of arranging each of the members becomes difficult.

The conditional expression (2) defines a ratio between the focal length of the lens unit LRP and the amount of movement at the time of zooming. If the amount of movement of the lens unit LRP becomes small so that the upper limit of the conditional expression (2) is not satisfied, the zooming share of the lens unit LRP decreases. Therefore, the lens units existing at sides closer to the object than the lens unit LRP become necessary to increase the amount of movement and/or shorten the focuses of lens units, the number of lenses increases, and it becomes difficult to reduce the size of the whole system.

If the amount of movement of the lens unit LRP becomes large to exceed the lower limit of the conditional expression (2), it becomes necessary to previously arrange the lens unit LRP to a side closer to the object at the wide-angle end. Then, at the wide-angle end, the diameter of a luminous flux passing through the lens unit LRP becomes large, and accordingly fluctuation in the optical performance due to the dispersion in the shape of the lens surface due to a manufacturing error becomes large, which is not desirable.

The conditional expression (3) defines a ratio between the focal length of the lens unit LRP and the focal length of the lens unit LP. The focal length of the lens unit LP largely affects the total lens length, and accordingly in order to reduce the size of the whole system, it largely affects the total lens length how strong the power of the lens unit LRP is as compared to the power of the lens unit LP having a comparatively short focal length (strong power) in the lens system. If the power of the lens unit LRP becomes weak to exceed the upper limit of the conditional expression (3), the incident angle of the luminous flux on the sensor becomes sharp at the wide-angle end, which is not desirable.

In order to secure the incident angle, it is necessary to arrange the position of the aperture stop SP1 to a side closer to the object; but when the position of the aperture stop SP1 is moved to a side closer to the object, the effective diameter of the lens unit LP immediately after the aperture stop SP1 increases and the correction of aberration becomes difficult, which is not desirable. In addition, the size of the lens unit at a side closer to the object than the lens unit LRP increases, which is not desirable. If the power of the lens unit LP becomes strong to exceed the upper limit of the conditional expression (3), the fluctuation in the spherical aberration and/or the fluctuation in the image plane at the time of zooming become large; and as a result, the number of lenses increases, and the size of the whole system increases, which is not desirable.

If the power of the lens unit LRP becomes strong to exceed the lower limit of the conditional expression (3), it becomes easy to reduce the size in the whole system; but by the power becoming strong, the curvature of the lens surface shape becomes sharp, and the lens thickness of the lens unit GRP becomes thick so as to satisfy the molding conditions, which makes it difficult to make the lens unit compact. In addition, the incident angle on the sensor becomes small, but the focal length of each of the lens units at a side closer to the object than the lens unit LRP becomes short, and the correction of aberration becomes difficult, which is not desirable. In addition, if the power of the lens unit LRP becomes weak to exceed the lower limit of the conditional expression (3), the amount of movement of the lens unit LP at the time of zooming increases, and the total lens length becomes long, which is not desirable.

The conditional expression (4) defines the lens shape of the positive lens GRP. The conditional expression (4) defines the central material thickness (thickness on optical axis) of the positive lens GRP and a degree of the convex shape of the lens surface on the object side toward the image side. If the sagittal amount becomes small to exceed the upper limit of the conditional expression (4), the ghost originating in the light which reflects on the sensor cover glass or the optical filter arranged at a position closer to the sensor side than the lens unit LRP tends to remain in the vicinity of the screen center, which is not desirable. Or, the lens material thickness of the lens GRP tends to increase, which makes it difficult to reduce the size of the whole system.

If the sagittal amount becomes large to exceed the lower limit of conditional expression (4), the ghost decreases and the lens material thickness also becomes thin. Because the sagittal amount becomes too large, the peripheral portion of the lens on the side of the lens surface existing on the object side of the positive lens GRP largely projects to the object side, and accordingly it becomes difficult to reduce the size at the time of the retractable barrel, which is not desirable.

Incidentally, in each of the embodiments, it is desirable to set the numerical ranges of the conditional expressions (1) to (4) in the following way:

$$0.16 < BkT/fW < 0.45 \quad (1a)$$

$$8.2 < fRP/mRP < 30.0 \quad (2a)$$

$$1.65 < fRP/fLP < 3.30 \quad (3a), \text{ and}$$

$$-2.50 < R1sag/DGRP < -0.16 \quad (4a).$$

In addition, the numerical ranges of the conditional expressions (1a) to (4a) can further be set as follows:

$$0.175 < BkT/fW < 0.430 \quad (1b)$$

$$8.4 < fRP/mRP < 20.0 \quad (2b)$$

$$1.65 < fRP/fLP < 3.00 \quad (3b), \text{ and}$$

$$-1.60 < R1sag/DGRP < -0.17 \quad (4b).$$

In each of the embodiments, it is possible to obtain a zoom lens having a compact whole system and high optical performance, by configuring the zoom lens in the above described way.

It is more desirable that the zoom lens in each of the embodiments can further satisfy one or more of the following conditional expressions. The specific gravity of the material of the positive lens GRP shall be represented by NGRP, the radius of curvature of the lens surface on the object side of the positive lens GRP shall be represented by R1, and the radius of curvature of the lens surface on the image side shall be represented by R2. The focal length of the whole system at the telephoto end shall be represented by fT. The focal length of the negative lens unit LN shall be represented by fLN. The Abbe number of the material of the positive lens GRP shall be represented by vdGRP, and the refractive index of the material of the positive lens GRP shall be represented by ndGRP.

The amount of movement of the negative lens unit LN at the time of zooming from the wide-angle end to the telephoto end shall be represented by mLN. The amount of movement of the positive lens unit LP at the time of zooming from the wide-angle end to the telephoto end shall be represented by mLP. The refractive index of the material of the lens arranged on a side closest to the object in the negative lens unit LN shall be represented by G1Nd. The focal length of the negative lens Fa for focusing shall be represented by fa. Here, the specific gravity of the material is defined to be a ratio between the mass of the material to be used for the lens at room temperature (15° C. to 25° C.) and the mass of pure water having the same volume as the material at 4° C. under a pressure of 100.325 kPa (standard pressure). At this time, it is acceptable that the zoom lens satisfies one or more of the following conditional expressions:

$$0.90 < NGRP < 1.30 \quad (5)$$

$$1.01 < (R1+R2)/(R1-R2) < 3.50 \quad (6)$$

$$2.0 < fRP/fW < 5.0 \quad (7)$$

$$1.40 < fRP/\sqrt{(fW \times fT)} < 4.00 \quad (8)$$

$$1.50 < |fRP/fLN| < 5.00 \quad (9)$$

$$50.0 < vdGRP < 60.0 \quad (10)$$

$$1.50 < ndGRP < 1.60 \quad (11)$$

$$0.40 < |mLN/mRP| < 1.50 \quad (12)$$

$$3.50 < |mLP/mRP| < 10.00 \quad (13)$$

$$0.50 < |fLP/fLN| < 2.50 \quad (14)$$

$$0.05 < mLN/mLP < 0.40 \quad (15)$$

$$1.870 < G1Nd < 2.060 \quad (16)$$

$$-1.30 < fa/fRP < -0.30 \quad (17).$$

Next, the technical meaning of each of the above described conditional expressions will be described below. The conditional expression (5) defines the specific gravity [g/cm3] of the material of the positive lens GRP. If the specific gravity of the material of the positive lens GRP becomes large to exceed the upper limit of the conditional expression (5), the weight of the positive lens GRP becomes heavy, and the size of the mechanical member such as the motor for moving the positive lens GRP at the time of zooming increases, which is not desirable. If the specific gravity of the material of the positive lens GRP becomes small to exceed the lower limit of the conditional expression (5), the positive lens GRP becomes light, which is desirable; but the resin materials satisfying the specific gravity become few, and it becomes difficult to select the material.

The conditional expression (6) relates to a shape factor that defines a meniscus shape of the positive lens GRP of which the convex surface faces the image side. If the shape factor exceeds the upper limit of the conditional expression (6), the focal length of the positive lens GRP tends to become long, and the incident angle of an off-axial ray on the sensor becomes large particularly at the wide-angle end, which is not desirable. If the shape factor exceeds the lower limit of the conditional expression (6), the focal length of the positive lens GRP becomes too short on the contrary, and the incident angle of the off-axial ray on the sensor becomes small; but the focal length of each of the lens units of the whole lens system becomes too short, and fluctuation in the optical performance at the time of zooming increases, which is not desirable.

The conditional expression (7) defines the refractive power of the lens unit LRP. If the positive refractive power of the lens unit LRP becomes weak to exceed the upper limit of the conditional expression (7), the incident angle of the luminous flux on the sensor becomes large at the wide-angle end. Otherwise, the total lens length needs to be increased in order to reduce the incident angle, which is not desirable.

If the refractive power of the lens unit LRP becomes strong to exceed the lower limit of the conditional expression (7), the incident angle on the sensor at the wide-angle end becomes small; but because the refractive power becomes too strong, the material thickness of the positive lens GRP results in increasing, and the size increases, which is not desirable. Because the positive lens GRP is arranged at a position close to the imaging point, the effective diameter of the light beam becomes large and the outer diameter of the lens becomes large. Therefore, when the curvature of the lens surface of the positive lens GRP becomes sharp, the lens material thickness tends to easily become thick so as to secure an edge thickness of a predetermined length, which is not desirable.

The conditional expression (8) defines the refractive power of the lens unit LRP. In particular, the conditional expression (8) defines the refractive power of the lens unit LRP with respect to the whole zoom range from the wide-angle end to the telephoto end. If the upper limit of conditional expression (8) is not satisfied, the zoom specification becomes high specification, or becomes such a configuration that the focal length of the lens unit LRP is long. If the focal length of the lens unit LRP becomes long, the incident angle of the luminous flux on the sensor becomes large, which is not desirable.

In addition, if the lower limit of the conditional expression (8) is not satisfied, the power of the positive refractive power of the lens unit LRP becomes strong to facilitate the miniaturization of the whole system; but the power of each of the lens units becomes too strong, and image plane variation by zooming increases, which is accordingly not desirable. In addition, the curvature of the lens surface becomes sharp, and the material thickness of the lens tends to become thick so as to secure the edge thickness of a predetermined length.

The conditional expression (9) defines a ratio between the focal length of the lens unit LRP and the focal length of the lens unit LN. If the power of the lens unit LRP becomes weak to exceed the upper limit of the conditional expression (9), the incident angle of the luminous flux on the sensor becomes large at the wide-angle end, which is not desirable.

In order to reduce the incident angle, the position of the aperture stop SP1 needs to be arranged in a side closer to the object, but if the position of the aperture stop SP1 is moved to the object side, the effective diameter of the unit of the lens unit LP, immediately after the aperture stop SP1 becomes large, and the correction of aberration becomes difficult. In addition, the size of the lens unit at a side closer to the object than the lens unit LRP increases, which is not desirable.

If the negative power of the lens unit LN becomes strong to exceed the upper limit of the conditional expression (9) (if absolute value of negative power becomes large), fluctuations in spherical aberration and image plane variation at the time of zooming become large, and as a result, the number of lenses increases, which is not desirable. When the power of the lens unit LRP becomes strong to exceed the lower limit of the conditional expression (9), the miniaturization of the whole system becomes easy. However, by the power becoming strong, the curvature of the lens surface becomes sharp, and the lens thickness of the positive lens GRP becomes thick so as to satisfy the molding conditions; and accordingly it becomes difficult to make the lens compact, which is not desirable.

In addition, the incident angle of the off-axial ray on the sensor becomes small, but the focal length of each of the lens units existing at sides closer to the object than the lens unit LRP becomes short, which makes it difficult to correct aberration. If the negative power of the lens unit LN becomes weak to exceed the lower limit of the conditional expression (9) (if absolute value of negative power becomes small), the amount of movement of the lens unit LP at the time of zooming increases, and the total lens length becomes long, which is not desirable.

The conditional expression (10) defines the Abbe number of the material of the positive lens GRP that constitutes the lens unit LRP having a positive refractive power. A material having large dispersion also exists in resin materials, but low dispersion material is used in consideration of the reduction of lateral chromatic aberration. When the Abbe number of the material of the positive lens GRP becomes large to exceed the upper limit of the conditional expression (10), it becomes easy to reduce the fluctuation of the lateral chromatic aberration at the time of zooming, but the resin materials become few, and it becomes difficult to select the material. In addition, when the Abbe number of the material becomes small to exceed the lower limit of the conditional expression (10), the fluctuation of the lateral chromatic aberration at the time of zooming increases, which is not desirable.

The conditional expression (11) defines the refractive index of the material of the positive lens GRP that constitutes the lens unit LRP having a positive refractive power. When the refractive index of the material of the positive lens GRP becomes high to exceed the upper limit of the conditional expression (11), the positive lens GRP can have the curvature of the lens surface gentle while strengthening the refractive power. Therefore, the miniaturization of the whole system becomes easy, but in resin materials, there is few resin material present in a high dispersion side, and lateral chromatic aberration results in increasing, which is not desirable.

If the refractive index of the material of the lens unit GRP becomes low to exceed the lower limit of the conditional expression (11), the curvature of the lens surface becomes sharp, the lens material thickness becomes thick so as to satisfy the molding conditions, and it becomes difficult to miniaturize the whole system in the retractable barrel, which is not desirable.

The conditional expression (12) defines a ratio between the amounts of movement of the lens unit LN and the lens unit LRP at the time of zooming. When the amount of movement of the lens unit LN becomes large to exceed the upper limit of the conditional expression (12), the mechanical structure for the retractable barrel becomes complicated, the number of retractable barrel steps results in increasing, and the size in the radial direction at the time when the barrel has retracted results in increasing, which is not desirable. If the amount of movement of the lens unit LN becomes small to exceed the lower limit of the conditional expression (12), the zooming share of the lens unit LRP increases, and the amount of movement at the time of zooming increases.

Therefore, the luminous flux passing through the positive lens GRP becomes thick at the wide-angle end at which the lens unit LRP is positioned at the side closest to the object, and accordingly the dispersion of the lens surface shape originating in a lens manufacturing error results in largely affecting the optical performance, which is not desirable.

The conditional expression (13) defines a ratio between the amounts of movement of the lens unit LP and the lens unit LRP at the time of zooming. If the amount of movement of the lens unit LP becomes large to exceed the upper limit of the conditional expression (13), the mechanical structure for the retractable barrel becomes complicated similarly to the lens unit LN, the number of retractable barrel steps results in increasing, and the size in the radial direction at the time when the barrel has retracted results in increasing, which is not desirable.

When the amount of movement of the lens unit LP becomes small to exceed the lower limit of the conditional expression (13), the zooming share of the lens unit LRP increases, and the amount of movement of the lens unit LRP at the time of zooming increases. Therefore, the luminous flux passing through the positive lens GRP becomes thick at the wide-angle end at which the lens unit LRP is positioned at the side closest to the object, and accordingly the dispersion of the lens surface shape originating in a lens manufacturing error results in largely affecting the optical performance, which is not desirable.

The conditional expression (14) defines a ratio between the refractive power of the lens unit LN and the refractive power of the lens unit LP. If the negative refractive power of the lens unit LN becomes stronger than the refractive power of the lens unit LP (if absolute value of negative refractive power becomes large) to exceed the upper limit of the conditional expression (14), the amount of movement of the lens unit LN at the time of zooming becomes large, and the total lens length at the telephoto end increases. In addition, the Petzval sum becomes small, and the image plane tends to become under, which is not desirable.

If the negative refractive power of the unit of the lens unit LN with respect to the lens unit LP becomes weak to exceed the lower limit of the conditional expression (14), the total lens length tends to become short, but the lens unit LN is expanded toward the radial direction to increase its size, which is not desirable. In addition, the Petzval sum becomes large, and the image plane tends to be over, which is not desirable.

The conditional expression (15) defines a ratio between the amounts of movement of the lens unit LN and the lens unit LP at the time of zooming. The conditional expression (15) affects the miniaturization of the whole lens system. If the amount of movement of the lens unit LN becomes large to exceed the upper limit of the conditional expression (15), the position at the telephoto end of the lens unit LN results in being arranged in a side largely closer to the object, and the total lens length at the telephoto end becomes long, which is not desirable.

If the amount of movement of the lens unit LN becomes small to exceed the lower limit of the conditional expression (15), the amount of movement of the lens unit LP becomes large at this time, and accordingly the total lens length at the telephoto end becomes long, which is not desirable. Alternatively, the negative power of the lens unit LN becomes strong, accordingly the Petzval sum becomes large, and the image plane tends to be over, which is not desirable.

The conditional expression (16) defines the refractive index of the material of the lens positioned at the side closest to the object, in the lenses of the lens unit LN. Specifically, the conditional expression (16) defines the size of the zoom lens in the radial direction. If the refractive index exceeds the upper limit of the conditional expression (16), the material becomes a material having a small Abbe number in existing materials, the materials of the positive lens in the achromatizing lens unit LN become few, and achromatization becomes difficult. If the refractive index exceeds the lower limit of the conditional expression (16), achromatizing materials increase but the refractive index becomes low, and accordingly the effective diameter of the front lens increases, which is not desirable.

The conditional expression (17) defines a ratio between the refractive power of the lens unit LRP and the refractive power of the negative lens Fa for focusing. If the refractive power of the lens unit LRP with respect to the negative lens Fa becomes strong to exceed the lower limit of the conditional expression (17), an incident angle of the luminous flux on the sensor at the wide-angle end becomes small; but because the refractive power of the lens unit LRP becomes strong, the thickness of the lens unit LRP increases, and the size of the whole system increases, which is not desirable.

If the negative refractive power of the negative lens Fa becomes weak to exceed the lower limit of the conditional expression (17), interference with the front and rear lenses occurs due to focusing, which is not desirable. If the refractive power of the lens unit LRP with respect to the negative lens Fa becomes weak to exceed the upper limit of the conditional expression (17), the incident angle of the luminous flux on the sensor at the wide-angle end becomes large, which is not desirable. In addition, coma can be adequately corrected, but the Petzval sum becomes large, and the image plane tends to be over, which is not desirable.

Incidentally, in each of the embodiments, it is desirable to set the numerical ranges of the conditional expressions (5) to (17) in the following way:

$$0.95 < NGRP < 1.20 \tag{5a}$$

$$1.20 < (R1+R2)/(R1-R2) < 3.20 \tag{6a}$$

$$2.5 < fRP/fW < 4.5 \tag{7a}$$

$$1.50 < fRP/\sqrt{(fW \times fT)} < 3.00 \tag{8a}$$

$$1.60 < |fRP/fLN| < 4.00 \tag{9a}$$

$$52.0 < vdGRP < 58.0 \tag{10a}$$

$$1.51 < ndGRP < 1.58 \tag{11a}$$

$$0.45 < |mLN/mRP| < 1.45 \tag{12a}$$

$$3.65 < |mLP/mRP| < 9.00 \tag{13a}$$

$$0.60 < |fLP/fLN| < 2.00 \tag{14a}$$

$$0.08 < mLN/mLP < 0.30 \tag{15a}$$

$$1.880 < G1Nd < 1.970 \tag{16a}$$

$$-1.20 < fa/fRP < -0.40 \tag{17a}$$

In addition, it is further desirable to set the numerical ranges of the conditional expressions (5) to (17) in the following way, and the effect that each of the conditional expressions means which have been previously described can be obtained at the maximum.

$$0.980 < NGRP < 1.050 \tag{5b}$$

$$1.40 < (R1+R2)/(R1-R2) < 3.00 \tag{6b}$$

$$3.0 < fRP/fW < 4.0 \tag{7b}$$

$$1.65 < fRP/\sqrt{(fW \times fT)} < 2.40 \tag{8b}$$

$$1.70 < |fRP/fLN| < 3.20 \tag{9b}$$

$$53.0 < vdGRP < 57.0 \tag{10b}$$

$$1.52 < ndGRP < 1.56 \tag{11b}$$

$$0.50 < |mLN/mRP| < 1.40 \tag{12b}$$

$$3.80 < |mLP/mRP| < 8.50 \tag{13b}$$

$$0.65 < |fLP/fLN| < 1.80 \tag{14b}$$

$$0.10 < mLN/mLP < 0.23 \tag{15b}$$

$$1.881 < G1Nd < 1.960 \tag{16b}$$

$$-1.10 < fa/fRP < -0.50 \tag{17b}$$

In each of the embodiments, the zoom lens having the compact whole system and high optical performance can be obtained, by configuring each of the elements in the above described way. Incidentally, in each of the embodiments, the elements can be configured in the following way. When it is aimed to miniaturize the lens diameter, the refractive power of the lens unit LN becomes strong, and accordingly the lens unit can be configured to have three lenses.

In order to miniaturize the whole system, it is considered to configure the lens unit LN so as to have two lenses of a negative lens and a positive lens, by which the number of the lenses is reduced. However, in order to miniaturize the size, the refractive power of the lens unit LN becomes strong, and the curvature of the lens surface of the negative lens becomes sharp; and in order to make the spherical aberration and image plane characteristics adequate, a space between the two lenses is needed, and accordingly the thickness of the lens unit LN increases after all. Therefore, by being configured in the previously described way, the lens unit LN divides the refractive power of the negative lens in itself, and thereby reduces the dimension of itself in the radial direction while securing the high optical performance. The lens unit LN can include a negative lens N1, a negative lens N2 and a positive lens N3, which are arranged sequentially from the object side to the image side.

In addition, a material having a high refractive index is adopted for the negative lens N1 in the side closest to the object, and the lens surface of the negative lens N2 having a smaller lens diameter than that of the negative lens N1 is made to be an aspheric surface; thereby the difficulty in working the aspheric surface is facilitated, and the zoom lens can be easily obtained that is compact and has high optical performance.

The lens unit LP has a positive refractive power. At the wide-angle end, when the axial ray passes through the lens unit LN having the negative refractive power, the axial ray becomes a divergent luminous flux, but as the lens unit LP that continues to the lens unit LN has a positive refractive power, the lens unit LP can acquire a converging function with respect to the luminous flux and can reduce the effective diameter of itself.

In addition, it is desirable that the lens unit LP is configured so as to have a positive lens P1, a positive lens P2 and a negative lens P3 arranged sequentially from the object side to the image side, and so that the positive lens P1 has an aspheric lens. By making the positive lens P1 positioned at the side closest to the object to be an aspheric lens, at which the effective diameter becomes large, it becomes easy to adequately correct the spherical aberration and the coma in the whole zoom region.

Next, the lens configuration of the zoom lens in each of the embodiments will be described below. The zoom lens in Embodiment 1 includes the following lens units that are arranged sequentially from the object side to the image side. The zoom lens includes the first lens unit L1 having a negative refractive power, an aperture stop SP1, the second lens unit L2 having a positive refractive power, the third lens unit L3 having a positive refractive power, and the fourth lens unit L4 having a positive refractive power.

In Embodiment 1, in order to miniaturize the whole system at the zoom magnification of approximately 3, the zoom configuration adopts a lens configuration of a negative lead, which has the first lens unit (lens unit LN) having a negative refractive power and the second lens unit (lens unit LP) having a positive refractive power, sequentially from the object side to the image side.

At the time of zooming from the wide-angle end to the telephoto end, the first lens unit L1 moves to the object side while drawing a convex locus to the image side, the aperture stop SP1 moves (independently) to the object side while drawing a different locus from that of the other lens units, the second lens unit L2 moves to the object side, and the third lens unit L3 moves to the object side. The fourth lens unit L4 moves to the image side. The flare cut stop SP2 moves while drawing the same locus as that of (integrally with) the second lens unit L2.

The first lens unit L1 is moved so as to be positioned at a side closer to the object at the telephoto end compared to the wide-angle end to shorten the total lens length at the wide-angle end, and the aperture stop SP1 and the first lens unit L1 are brought close to each other to reduce the effective diameter of a front lens. In addition, at the time of zooming, the aperture stop SP1 moves while drawing a different locus from each of the lens units. The aperture stop SP1 moves so as to approach the second lens unit L2 at the time of zooming from the wide-angle end to the telephoto end, and thereby cuts off the under rays of the off-axis light beams at the time of zooming.

In addition, at the time of zooming, the second lens unit L2 having the positive refractive power and the third lens unit L3 having the positive refractive power move while drawing different loci from each other, which alleviates the fluctuation of the image plane characteristics at the time of zooming. In addition, at the time of zooming from the wide-angle end to the telephoto end, the fourth lens unit L4 having the positive refractive power moves to the image side to show the zooming effect, which thereby reduces the amounts of movement of the second lens unit L2 and the third lens unit L3 at the time of zooming and shortens the total lens length at the telephoto end.

In the present embodiment, the fourth lens unit L4 is a lens unit LRP which is positioned at the side closest to the image and has the positive refractive power. The lens unit LRP is composed of one positive lens. The lens unit LRP is configured to have the positive refractive power, thereby locates the exit pupil at the wide-angle end away to the object side, and makes the telecentricity adequate. In addition, by giving the lens unit LRP a certain degree of positive refractive power, it is attempted to miniaturize the lens unit existing in a side closer to the object than the lens unit LRP, while making the telecentricity adequate.

In addition, in order to alleviate an influence on the optical performance due to the change of the shape of the lens surface, which originates in the environmental change, the lens unit LRP is arranged at a position close to the imaging point (image plane). When the lens unit LRP is arranged at a position close to the imaging point, the effective diameter of the lenses becomes large; and accordingly if the lens unit LRP includes a plurality of lenses, the thickness of the lens unit increases, which increases the size of the lens unit. Therefore, the lens unit LRP is composed of one lens GRP. In addition, because the lens unit LRP is arranged at a position close to the imaging point, the effective diameter of the lens becomes large, and accordingly the lens becomes heavy in such an optical system as to correspond to a large size sensor.

Therefore, the material of the lens GRP is made from a resin to reduce the weight. In addition, the lens GRP is configured to have a meniscus shape of which the convex surface faces the image side. Because there are restrictions on working for lenses, a certain degree of thickness needs to be given to the peripheral portion of the lens. If a thickness is given to a peripheral portion of a lens having a shape such as a biconvex lens, a material thickness of the center increases, and a thickness of the retractable barrel increases, which becomes disadvantageous for the compactness. Therefore, if a sensor having a large-sized effective surface is used, the effective diameter of the lens GRP becomes large, and accordingly the material thickness of the center tends to become thick.

Then, the lens GRP is configured to obtain a certain peripheral material thickness (edge) by being formed into a meniscus shape, while suppressing an increase of the material thickness of the center. In addition, when there is a lens surface of which the convex surface faces the sensor side, there is a case where the ghost ray is generated in the vicinity of the center of the image, due to reflection on the cover glass of the sensor, or on the optical filter in between the lens GRP and the cover glass of the sensor. Then, the lens GRP is configured to have such a meniscus shape that both of the lens surfaces have convex shapes toward the image side, and thereby avoids the ghost ray which is incident on the vicinity of the center of the screen.

In addition, when the material of the lens GRP is a resin, the reflectivity of a coating formed on the lens surface is generally high compared to that of a coating on a glass material, and the ghost strength also increases. Therefore, in order to reduce the occurrence of the ghost, the lens is configured to have the meniscus shape. The third lens unit L3 having the positive refractive power has a negative lens Fa on the image side. The lens unit LRP having the positive refractive power is arranged at the side closest to the image, thereby converges the luminous flux on the object side of itself, and thereby reduces the effective diameter of the lens Fa that is arranged on the object side of the lens unit LRP.

In addition, the lens Fa is configured to have a negative refractive power to shorten the total lens length and miniaturize the whole system. In addition, the compact and lightweight lens Fa is configured to be a focus lens, which thereby facilitates quick focusing. The lens Fa is configured to move to the image side at the time of focusing from infinity to close range.

In the cross-sectional view of the zoom lens, a solid line curve Faa and a dotted line curve Fab concerning the lens Fa are movement loci for correcting the fluctuations of the image point, which occur during zooming at the time when the lens Fa adjusts the focus to the infinity and to the close range, respectively. In addition, when the lens Fa adjusts the focus from the infinity to the close range, at the telephoto end, the lens Fa moves to the image side to adjust the focus, as shown by the arrow Fac. In addition, the lens Fa is configured to have a refractive power of an opposite sign to that of the lens unit LRP having the positive refractive power, and thereby to have a strong negative refractive power. Thereby, the lens Fa is configured so as to have higher position sensitivity than that in the case where the lens unit LRP, for instance, adjusts the focus, and so as to reduce the amount of movement during focusing.

A zoom lens of Embodiment 2 includes the following lens units that are arranged sequentially from the object side to the image side. The zoom lens includes the first lens unit L1 having a negative refractive power, an aperture stop SP1, a second lens unit L2 having a positive refractive power, a third lens unit L3 having a positive refractive power, a fourth lens unit L4 having a negative refractive power, and a fifth lens unit L5 having a positive refractive power. In Embodiment 2, in order to miniaturize the whole system at a zoom magnification of approximately 3, the zoom configuration adopts a lens configuration of a negative lead, which has the first lens unit (lens unit LN) having the negative refractive power and the second lens unit (lens unit LP) having the positive refractive power, sequentially from the object side to the image side.

At the time of zooming from the wide-angle end to the telephoto end, the first lens unit L1 moves to the object side while drawing a convex locus to the image side, the aperture stop SP1 moves to the object side while drawing a different locus from that of the other lens units, the second lens unit L2 moves to the object side, and the third lens unit L3 moves to the object side. The fourth lens unit L4 moves to the object side, and the fifth lens unit L5 moves to the image side. The flare cut stop SP2 moves while drawing the same locus as that of the second lens unit L2.

The first lens unit L1 moves so as to be positioned at a side closer to the object at the telephoto end compared to the wide-angle end to shorten the total lens length at the wide-angle end, and the aperture stop SP1 and the first lens unit L1 are brought close to each other to reduce the effective diameter of a front lens. In addition, at the time of zooming, the aperture stop SP1 moves while drawing a different locus from each of the lens units; and moves so as to approach the second lens unit L2 at the time of zooming from the wide-angle end to the telephoto end, thereby cuts off the under rays of the off-axis light beams at the time of zooming to obtain adequate optical performance.

In addition, at the time of zooming, the second lens unit L2 having the positive refractive power, the third lens unit L3 having the positive refractive power and the fourth lens unit L4 move while drawing different loci from each other, which alleviates the fluctuation of the image plane characteristics at the time of zooming. In addition, at the time of zooming from the wide-angle end to the telephoto end, the fifth lens unit L5 having the positive refractive power moves to the image side to show the zooming effect. Thereby, the fifth lens unit L5 reduces the amounts of movement of the second lens unit L2, the third lens unit L3 and the fourth lens unit L4 at the time of zooming, and shortens the total lens length at the telephoto end.

In the present embodiment, the fifth lens unit L5 is a lens unit LRP which is positioned at the side closest to the image and has the positive refractive power. The lens unit LRP is composed of one positive lens. The lens unit LRP is configured to have the positive refractive power, thereby locates the exit pupil at the wide-angle end away to the object side, and makes the telecentricity adequate. In addition, the lens unit LRP is provided with a certain degree of positive refractive power to miniaturize the lens unit existing in a side closer to the object than the lens unit LRP, while making the telecentricity adequate.

In addition, in order to alleviate an influence on the optical performance due to the change of the shape of the lens surface, which originates in the environmental change, the lens unit LRP is arranged at a position close to the imaging point (image plane). When the lens unit LRP is arranged at a position close to the imaging point, the effective diameter of the lens becomes large; and accordingly if the lens unit LRP includes a plurality of lenses, the thickness of the lens unit increases, which increases the size of the lens unit. Therefore, the lens unit LRP is composed of one lens GRP. In addition, because the lens unit LRP is arranged at a position close to the imaging point, the effective diameter of the lens becomes large, and accordingly the lens becomes heavy in such an optical system as to correspond to a large size sensor.

Therefore, the material of the lens GRP is made from a resin to reduce the weight. In addition, the lens GRP is configured to have a meniscus shape of which the convex surface faces the image side. Because there are restrictions on working for lenses, a certain degree of thickness needs to be given to the peripheral portion of the lens. If a thickness is given to a peripheral portion of a lens having a shape such as a biconvex lens, a material thickness of the center increases, and a thickness of the retractable barrel increases, which becomes disadvantageous for the compactness. Therefore, if a sensor having a large-sized effective surface is used, the effective diameter of the lens GRP becomes large, and accordingly the material thickness of the center tends to become thick.

Then, the lens GRP is configured to obtain a certain peripheral material thickness (edge) by being formed into a meniscus shape, while suppressing an increase of the material thickness of the center. In addition, when there is a lens surface of which the convex surface faces the sensor side, there is a case where the ghost ray is generated in the vicinity of the center of the image, due to reflection on the cover glass of the sensor, or on the optical filter in between the lens GRP and the cover glass of the sensor. Then, the lens GRP is configured to have such a meniscus shape that both of the lens surfaces have convex shapes toward the image side, and thereby avoids the ghost ray which is incident on the vicinity of the center of the screen.

In addition, when the material of the lens GRP is a resin, the reflectivity of a coating formed on the lens surface is generally high compared to that of a coating on a glass material, and the ghost strength also increases. Therefore, in order to reduce the occurrence of the ghost, the lens is configured to have the meniscus shape. The fourth lens unit L4 is composed of one negative lens Fa. The lens unit LRP having the positive refractive power is arranged at the side closest to the image, thereby converges the luminous flux on the object side of itself, and thereby reduces the effective diameter of the lens Fa that is arranged on the object side of the lens unit LRP.

In addition, the lens Fa is configured to have a negative refractive power to shorten the total lens length and miniaturize the whole system. In addition, the compact and lightweight lens Fa is adopted as a focus lens, which thereby facilitates quick focusing. The lens Fa is configured to move to the image side at the time of focusing from infinity to close range.

In the cross-sectional view of the zoom lens, a solid line curve Faa and a dotted line curve Fab concerning the lens Fa are movement loci for correcting the fluctuations of the image point, which occur during zooming at the time when the lens Fa adjusts the focus to the infinity and to the close range, respectively. In addition, when the lens Fa adjusts the focus from the infinity to the close range, at the telephoto end, the lens Fa moves to the image side to adjust the focus, as shown by the arrow Fac. In addition, the lens Fa is configured to have a refractive power of an opposite sign to that of the lens unit LRP having the positive refractive power, and thereby to have a strong negative refractive power. Thereby, the lens Fa is configured so as to have higher position sensitivity than that in the case, for instance, where the lens unit LRP adjusts the focus, and so as to reduce the amount of movement during focusing.

A zoom lens of Embodiment 3 includes the following lens units that are arranged sequentially from the object side to the image side. The zoom lens includes the first lens unit L1 having a negative refractive power, an aperture stop SP1, the second lens unit L2 having a positive refractive power, and the third lens unit L3 having a positive refractive power. In Embodiment 3, in order to miniaturize the whole system at a zoom magnification of approximately 3, the zoom configuration adopts a lens configuration of a negative lead, which has the first lens unit (lens unit LN) having the negative refractive power and the second lens unit (lens unit LP) having the positive refractive power, sequentially from the object side to the image side.

At the time of zooming from the wide-angle end to the telephoto end, the first lens unit L1 moves to the object side while drawing a convex locus to the image side, the aperture stop SP1 moves to the object side while drawing a different locus from that of the other lens units, and the second lens unit L2 moves to the object side. The third lens unit L3 moves to the image side. The flare cut stop SP2 moves while drawing the same locus as that of the second lens unit L2.

The first lens unit L1 is moved so as to be positioned at a side closer to the object at the telephoto end compared to the wide-angle end to shorten the total lens length at the wide-angle end, and the aperture stop SP1 and the first lens unit L1 are brought close to each other to reduce the effective diameter of a front lens. In addition, at the time of zooming, the aperture stop SP1 moves while drawing a different locus from each of the lens units. The aperture stop SP1 moves so as to approach the second lens unit L2 at the time of zooming from the wide-angle end to the telephoto end, and thereby cuts off the under rays of the off-axis light beams at the time of zooming to obtain adequate optical performance.

In addition, at the time of zooming from the wide-angle end to the telephoto end, the third lens unit L3 having the positive refractive power moves to the image side to show the zooming effect, which thereby reduces the amount of movement of the second lens unit L2 at the time of zooming and shortens the total lens length at the telephoto end.

In the present embodiment, the third lens unit L3 is a lens unit LRP which is positioned at the side closest to the image and has the positive refractive power. The lens unit LRP is composed of one positive lens. The lens unit LRP is configured to have the positive refractive power, thereby locates the exit pupil at the wide-angle end away to the object side, and makes the telecentricity adequate. In addition, by giving the lens unit LRP a certain degree of positive refractive power, it is attempted to miniaturize the lens unit existing in a side closer to the object than the lens unit LRP, while making the telecentricity adequate.

In addition, in order to alleviate an influence on the optical performance due to the change of the shape of the lens surface, which originates in the environmental change, the lens unit LRP is arranged at a position close to the imaging point (image plane). When the lens unit LRP is arranged at a position close to the imaging point, the effective diameter of the lens becomes large; and accordingly if the lens unit LRP includes a plurality of lenses, the thickness of the lens unit increases, which increases the size of the lens unit. Therefore, the lens unit LRP is composed of one lens GRP. In addition, because the lens unit LRP is arranged at a position close to the imaging point, the effective diameter of the lens becomes large, and accordingly the lens becomes heavy in such an optical system as to correspond to a large size sensor.

Therefore, the material of the lens GRP is made from a resin to reduce the weight. In addition, the lens GRP is configured to have a meniscus shape of which the convex surface faces the image side. Because there are restrictions on working for lenses, a certain degree of thickness needs to be given to the peripheral portion of the lens. If a thickness is given to a peripheral portion of a lens having a shape such as a biconvex lens, a material thickness of the center increases, and a thickness of the retractable barrel increases, which becomes disadvantageous for the compactness. Therefore, if a sensor having a large-sized effective surface is used, the effective diameter of the lens GRP becomes large, and accordingly the material thickness of the center tends to become thick.

Then, the lens GRP is configured to obtain a certain peripheral material thickness (edge) by being formed into a meniscus shape, while suppressing an increase of the material thickness of the center. In addition, when there is a lens face of which the convex surface faces the sensor side, there is a case where the ghost ray is generated in the vicinity of the center of the image, due to reflection on the cover glass of the sensor, or on the optical filter in between the lens GRP and the cover glass of the sensor. Then, the lens GRP is configured to have such a meniscus shape that both of the lens surfaces have convex shapes toward the image side, and thereby avoids the ghost ray which is incident on the vicinity of the center of the screen.

In addition, when the material of the lens GRP is a resin, the reflectivity of a coating formed on the lens surface is generally high compared to that of a coating on a glass material, and the ghost strength also increases. Therefore, in order to reduce the occurrence of the ghost, the lens is configured to have the meniscus shape. The second lens unit L2 having the positive refractive power has a negative lens Fa on the image side. The lens unit LRP having the positive refractive power is arranged at the side closest to the image, thereby converges the luminous flux on the object side of itself, and thereby reduces the effective diameter of the lens Fa that is arranged on the object side of the lens unit LRP.

In addition, the lens Fa is configured to have a negative refractive power to shorten the total lens length and miniaturize the whole system. In addition, the compact and lightweight lens Fa is adopted as a focus lens, which thereby facilitates quick focusing. The lens Fa is configured to move to the image side at the time of focusing from infinity to close range.

In the cross-sectional view of the zoom lens, a solid line curve Faa and a dotted line curve Fab concerning the lens Fa are movement loci for correcting the fluctuations of the image point, which occur during zooming at the time when the lens Fa adjusts the focus to the infinity and to the close range, respectively. In addition, when the lens Fa adjusts the focus from the infinity to the close range, at the telephoto end, the lens Fa moves to the image side to adjust the focus, as shown by the arrow Fac. In addition, the lens Fa is configured to have a refractive power of an opposite sign to that of the lens unit LRP having the positive refractive power, and thereby to have a strong negative refractive power. Thereby, the lens Fa is configured so as to have higher position sensitivity than that in the case, for instance, where the lens unit LRP adjusts the focus, and so as to reduce the amount of movement during focusing.

A zoom lens of Embodiment 4 includes the following lens units that are arranged sequentially from the object side to the image side. The zoom lens includes the first lens unit L1 having a negative refractive power, an aperture stop SP1, the second lens unit L2 having a positive refractive power, the third lens unit L3 having a negative refractive power, and the fourth lens unit L4 having a positive refractive power. In Embodiment 4, in order to miniaturize the whole system at a zoom magnification of approximately 3, the zoom configuration adopts a lens configuration of a negative lead, which has the first lens unit (lens unit LN) having the negative refractive power and the second lens unit (lens unit LP) having the positive refractive power, sequentially from the object side to the image side.

At the time of zooming from the wide-angle end to the telephoto end, the first lens unit L1 moves to the object side while drawing a convex locus to the image side, the aperture stop SP1 moves to the object side while drawing a different locus from that of the other lens units, the second lens unit L2 moves to the object side, and the third lens unit L3 moves to the object side. The fourth lens unit L4 moves to the image side. The flare cut stop SP2 moves integrally with the second lens unit L2.

The first lens unit L1 is moved so as to be positioned at a side closer to the object at the telephoto end compared to the wide-angle end to shorten the total lens length at the wide-angle end, and the aperture stop SP1 and the first lens unit L1 are brought close to each other to reduce the effective diameter of a front lens. In addition, at the time of zooming, the aperture stop SP1 moves while drawing a different locus from each of the lens units. The aperture stop SP1 moves so as to approach the second lens unit L2 at the time of zooming from the wide-angle end to the telephoto end, and thereby cuts off the under rays of the off-axis light beams at the time of zooming to obtain adequate optical performance.

In addition, at the time of zooming, the second lens unit L2 having the positive refractive power and the third lens unit L3 having the positive refractive power move while drawing different loci from each other, which alleviates the fluctuation of the image plane characteristics at the time of zooming. In addition, at the time of zooming from the wide-angle end to the telephoto end, the fourth lens unit L4 having the positive refractive power moves to the image side to show the zooming effect, which thereby reduces the amount of movement of the second lens unit L2 and the third lens unit L3 at the time of zooming and shortens the total lens length at the telephoto end.

In the present embodiment, the fourth lens unit L4 is a lens unit LRP which is positioned at the side closest to the image and has the positive refractive power. The lens unit LRP is composed of one positive lens. The lens unit LRP is configured to have the positive refractive power, thereby locates the exit pupil at the wide-angle end away to the object side, and makes the telecentricity adequate. In addition, the lens unit LRP is provided with a certain degree of positive refractive power to miniaturize the lens unit existing in a side closer to the object than the lens unit LRP, while making the telecentricity adequate.

In addition, in order to alleviate an influence on the optical performance due to the change of the shape of the lens surface, which originates in the environmental change, the lens unit LRP is arranged at a position close to the imaging point (image plane). When the lens unit LRP is arranged at a position close to the imaging point, the effective diameter of the lens becomes large; and accordingly if the lens unit LRP includes a plurality of lenses, the thickness of the lens unit increases, which increases the size of the lens unit. Therefore, the lens unit LRP is composed of one lens GRP. In addition, because the lens unit LRP is arranged at a position close to the imaging point, the effective diameter of the lens becomes large, and accordingly the lens becomes heavy in such an optical system as to correspond to a large size sensor.

Therefore, the material of the lens GRP is made from a resin to reduce the weight. In addition, the lens GRP is configured to have a meniscus shape of which the convex surface faces the image side. Because there are restrictions on working for lenses, a certain degree of thickness needs to be given to the peripheral portion of the lens. If a thickness is given to a peripheral portion of a lens having a shape such as a biconvex lens, a material thickness of the center increases, and a thickness of the retractable barrel increases, which becomes disadvantageous for the compactness. Therefore, if a sensor having a large-sized effective surface is used, the effective diameter of the lens GRP becomes large, and accordingly the material thickness of the center tends to become thick.

Then, the lens GRP is configured to obtain a certain peripheral material thickness (edge) by being formed into a meniscus shape, while suppressing an increase of the material thickness of the center. In addition, when there is a lens surface of which the convex surface faces the sensor side, there is a case where the ghost ray is generated in the vicinity of the center of the image, due to reflection on the cover glass of the sensor, or on the optical filter in between the lens GRP and the cover glass of the sensor. Then, the lens GRP is configured to have such a meniscus shape that both of the lens surfaces have convex shapes toward the image side, and thereby avoids the ghost ray which is incident on the vicinity of the center of the screen.

In addition, when the material of the lens GRP is a resin, the reflectivity of a coating formed on the lens surface is generally high compared to that of a coating on a glass material, and the ghost strength also increases. Therefore, in order to reduce the occurrence of the ghost, the lens is configured to have the meniscus shape. The third lens unit L3 having the negative refractive power is configured to have a negative lens Fa of which the convex surface faces the image side. The lens unit LRP having the positive refractive power is arranged at the side closest to the image, thereby converges the luminous flux on the object side of itself, and thereby reduces the effective diameter of the lens Fa that is arranged on the object side of the lens unit LRP.

In addition, the lens Fa is configured to have a negative refractive power to shorten the total lens length and miniaturize the whole system. In addition, the compact and lightweight lens Fa is adopted as a focus lens, which thereby facilitates quick focusing. The lens Fa is configured to move to the image side at the time of focusing from infinity to close range.

In the cross-sectional view of the zoom lens, a solid line curve Faa and a dotted line curve Fab concerning the lens Fa are movement loci for correcting the fluctuations of the image point, which occur during zooming at the time when the lens Fa adjusts the focus to the infinity and to the close range, respectively. In addition, when the lens Fa adjusts the focus from the infinity to the close range, at the telephoto end, the lens Fa moves to the image side to adjust the focus, as shown by the arrow Fac. In addition, the lens Fa is configured to have a refractive power of an opposite sign to that of the lens unit LRP having the positive refractive power, and thereby to have a strong negative refractive power. Thereby, the lens Fa is configured so as to have higher position sensitivity than that in the case, for instance, where the lens unit LRP adjusts the focus, and so as to reduce the amount of movement during focusing.

A zoom lens of Embodiment 5 includes the following lens units that are arranged sequentially from the object side to the image side. The zoom lens includes the first lens unit L1 having a positive refractive power, the second lens unit L2 having a negative refractive power, an aperture stop SP1, the third lens unit L3 having a positive refractive power, the fourth lens unit L4 having a positive refractive power, and the fifth lens unit L5 having a positive refractive power.

In Embodiment 5, in order to miniaturize the whole system at a zoom magnification of approximately 4 by an f-number of 2.06 of a large f-number at the wide-angle end, the zoom configuration has the following configuration, sequentially from the object side to the image side. The zoom configuration has a lens configuration of a positive lead, which has the first lens unit having a positive refractive power, the second lens unit (lens unit NP) having a negative refractive power, and the third lens unit (lens unit LP) having a positive refractive power.

At the time of zooming from the wide-angle end to the telephoto end, the first lens unit L1 moves to the object side, the second lens unit L2 moves to the object side while drawing a convex locus to the image side, and the aperture stop SP1 moves to the object side while drawing a different trajectory from that of the other lens units. The third lens unit L3 moves to the object side, and the fourth lens unit L4 moves to the object side. The fifth lens unit L5 moves to the image side. The flare cut stop SP2 moves integrally with the second lens unit L2.

The first lens unit L1 moves so as to be positioned at a side closer to the object at the telephoto end compared to the wide-angle end, and thereby is configured to make the focal length at the telephoto end long, while shortening the total lens length at the wide-angle end. The second lens unit L2 is moved so as to be positioned at a side closer to the object while drawing a convex locus to the image side to shorten the total lens length at the wide-angle end, at the time of zooming from the wide-angle end to the telephoto end, and the aperture stop SP1 and the first lens unit L1 are brought close to each other to reduce the effective diameter of a front lens.

In addition, at the time of zooming, the aperture stop SP1 moves while drawing the different locus from each of the lens units. The aperture stop SP1 moves to the object side at the time of zooming from the wide-angle end to the telephoto end, and thereby cuts off the under rays of the off-axis light beams at the time of zooming to obtain adequate optical performance. In addition, at the time of zooming, the third lens unit L3 having the positive refractive power and the fourth lens unit L4 having the positive refractive power move while drawing different loci from each other, which alleviates the fluctuation of the image plane characteristics at the time of zooming.

In addition, at the time of zooming from the wide-angle end to the telephoto end, the fifth lens unit L5 having the positive refractive power moves to the image side to show the zooming effect, which thereby reduces the amount of movement of the third lens unit L3 and the fourth lens unit L4 at the time of zooming and shortens the total lens length at the telephoto end.

In the present embodiment, the fifth lens unit L5 is a lens unit LRP which is positioned at the side closest to the image and has the positive refractive power. The lens unit LRP is composed of one positive lens. The lens unit LRP is configured to have the positive refractive power, thereby locates the exit pupil at the wide-angle end away to the object side, and makes the telecentricity adequate. In addition, the lens unit LRP is provided with a certain degree of positive refractive power to miniaturize the lens unit existing in a side closer to the object than the lens unit LRP, while making the telecentricity adequate.

In addition, in order to alleviate an influence on the optical performance due to the change of the shape of the lens surface, which originates in the environmental change, the lens unit LRP is arranged at a position close to the imaging point (image plane). When the lens unit LRP is arranged at a position close to the imaging point, the effective diameter of the lens becomes large; and accordingly if the lens unit LRP includes a plurality of lenses, the thickness of the lens unit increases, which increases the size of the lens unit. Therefore, the lens unit LRP is composed of one lens GRP. In addition, because the lens unit LRP is arranged at a position close to the imaging point, the effective diameter of the lens becomes large, and accordingly the lens becomes heavy in such an optical system as to correspond to a large size sensor.

Therefore, the material of the lens GRP is made from a resin to reduce the weight. In addition, the lens GRP is configured to have a meniscus shape of which the convex surface faces the image side. Because there are restrictions on working for lenses, a certain degree of thickness needs to be given to the peripheral portion of the lens. If a thickness is given to a peripheral portion of a lens having a shape such as a biconvex lens, a material thickness of the center increases, and a thickness of the retractable barrel increases, which becomes disadvantageous for the compactness. Therefore, if a sensor having a large-sized effective surface is used, the effective diameter of the lens GRP becomes large, and accordingly the material thickness of the center tends to become thick.

Then, the lens GRP is configured to obtain a certain peripheral material thickness (edge) by being formed into a meniscus shape, while suppressing an increase of the material thickness of the center. In addition, when there is a lens surface of which the convex surface faces the sensor side, there is a case where the ghost ray is generated in the vicinity of the center of the image, due to reflection on the cover glass of the sensor, or on the optical filter in between the lens GRP and the cover glass of the sensor. Then, the lens GRP is configured to have such a meniscus shape that both of the lens surfaces have convex shapes toward the image side, and thereby avoids the ghost ray which is incident on the vicinity of the center of the screen.

In addition, when the material of the lens GRP is a resin, the reflectivity of a coating formed on the lens surface is generally high compared to that of a coating on a glass material, and the ghost strength also increases. Therefore, in order to reduce the occurrence of the ghost, the lens is configured to have the meniscus shape. The fourth lens unit L4 having the positive refractive power has a negative lens Fa on the image side. The lens unit LRP having the positive refractive power is arranged at the side closest to the image, thereby converges the luminous flux on the object side of itself, and thereby reduces the effective diameter of the lens Fa that is arranged on the object side of the lens unit LRP.

In addition, the lens Fa is configured to have a negative refractive power to shorten the total lens length and miniaturize the whole system. In addition, the compact and lightweight lens Fa is configured to be a focus lens, which thereby facilitates quick focusing. The lens Fa is configured to move to the image side at the time of focusing from infinity to close range.

In the cross-sectional view of the zoom lens, a solid line curve Faa and a dotted line curve Fab concerning the lens Fa are movement loci for correcting the fluctuations of the image point, which occur during zooming at the time when the lens Fa adjusts the focus to the infinity and to the close range, respectively. In addition, when the lens Fa adjusts the focus from the infinity to the close range, at the telephoto end, the lens Fa moves to the image side to adjust the focus, as shown by the arrow Fac. In addition, the lens Fa is configured to have a refractive power of an opposite sign to that of the lens unit LRP having the positive refractive power, and thereby to have a strong negative refractive power. Thereby, the lens Fa is configured so as to have higher position sensitivity than that in the case where the lens unit LRP, for instance, adjusts the focus, and so as to reduce the amount of movement during focusing.

A zoom lens of Embodiment 6 includes the following lens units that are arranged sequentially from the object side to the image side. The zoom lens includes the first lens unit L1 having a positive refractive power, the second lens unit L2 having a negative refractive power, an aperture stop SP1, the third lens unit L3 having a positive refractive power, the fourth lens unit L4 having a positive refractive power, the fifth lens unit L5 having a negative refractive power, and the sixth lens unit L6 having a positive refractive power.

In Embodiment 6, in order to miniaturize the whole system at a zoom magnification of approximately 4 by an f-number of 2.06 of a large f-number at the wide-angle end, the zoom configuration has the following configuration, sequentially from the object side to the image side. The zoom configuration has a lens configuration of a positive lead having the first lens unit having the positive refractive power, the second lens unit (lens unit LN) having the negative refractive power, and the third lens unit (lens unit LP) having the positive refractive power.

At the time of zooming from the wide-angle end to the telephoto end, the first lens unit L1 moves to the object side, the second lens unit L2 moves to the object side while drawing a convex locus to the image side, and the aperture stop SP1 moves to the object side while drawing a different locus from that of the other lens units. The third lens unit L3 moves to the object side, and the fourth lens unit L4 moves to the object side. The fifth lens unit L5 moves to the object side, and the sixth lens unit L6 moves to the image side. The flare cut stop SP2 moves integrally with the third lens unit L3.

The first lens unit L1 is moved so as to be positioned at a side closer to the object at the telephoto end compared to the wide-angle end to shorten the total lens length at the wide-angle end, and the aperture stop SP1 and the first lens unit L1 are brought close to each other to reduce the effective diameter of a front lens. In addition, at the time of zooming, the aperture stop SP1 moves while drawing a different locus from each of the lens units. The aperture stop SP1 moves to the object side at the time of zooming from the wide-angle end to the telephoto end, and thereby cuts off the under rays of the off-axis light beams at the time of zooming to obtain adequate optical performance.

In addition, at the time of zooming, the third lens unit L3 having the positive refractive power, the fourth lens unit L4 having the positive refractive power and the fifth lens unit L5 having the negative refractive power move while drawing different loci from each other, which alleviates the fluctuation of the image plane characteristics at the time of zooming. In addition, at the time of zooming from the wide-angle end to the telephoto end, the sixth lens unit L6 having the positive refractive power moves to the image side to show the zooming effect. Thereby, the sixth lens unit L6 reduces the amounts of movement of the third lens unit L3, the fourth lens unit L4 and the fifth lens unit L5 at the time of zooming, and shortens the total lens length at the telephoto end.

In the present embodiment, the sixth lens unit L6 is a lens unit LRP which is positioned at the side closest to the image and has the positive refractive power. The lens unit LRP is composed of one positive lens. The lens unit LRP is configured to have the positive refractive power, thereby locates the exit pupil at the wide-angle end away to the object side, and makes the telecentricity adequate. In addition, the lens unit LRP is provided with a certain degree of positive refractive power, it is attempted to miniaturize the lens unit existing in a side closer to the object than the lens unit LRP, while making the telecentricity adequate.

In addition, in order to alleviate an influence on the optical performance due to the change of the shape of the lens surface, which originates in the environmental change, the lens unit LRP is arranged at a position close to the imaging point (image plane). When the lens unit LRP is arranged at a position close to the imaging point, the effective diameter of the lens becomes large; and accordingly if the lens unit LRP includes a plurality of lenses, the thickness of the lens unit increases, which increases the size of the lens unit. Therefore, the lens unit LRP is composed of one lens GRP. In addition, because the lens unit LRP is arranged at a position close to the imaging point, the effective diameter of the lens becomes large, and accordingly the lens becomes heavy in such an optical system as to correspond to a large size sensor.

Therefore, the material of the lens GRP is made from a resin to reduce the weight. In addition, the lens GRP is configured to have a meniscus shape of which the convex surface faces the image side. Because there are restrictions on working for lenses, a certain degree of thickness needs to be given to the peripheral portion of the lens. If a thickness is given to a peripheral portion of a lens having a shape such as a biconvex lens, a material thickness of the center increases, and a thickness of the retractable barrel increases, which becomes disadvantageous for the compactness. Therefore, if a sensor having a large-sized effective surface is used, the effective diameter of the lens GRP becomes large, and accordingly the material thickness of the center tends to become thick.

Then, the lens GRP is configured to obtain a certain peripheral material thickness (edge) by being formed into a meniscus shape, while suppressing an increase of the material thickness of the center. In addition, when there is a lens surface of which the convex surface faces the sensor side, there is a case where the ghost ray is generated in the vicinity of the center of the image, due to reflection on the cover glass of the sensor, or on the optical filter in between the lens GRP and the cover glass of the sensor. Then, the lens GRP is configured to have such a meniscus shape that both of the lens surfaces have convex shapes toward the image side, and thereby avoids the ghost ray which is incident on the vicinity of the center of the screen.

In addition, when the material of the lens GRP is a resin, the reflectivity of a coating formed on the lens surface is generally high compared to that of a coating on a glass material, and the ghost strength also increases. Therefore, in order to reduce the occurrence of the ghost, the lens is configured to have the meniscus shape. The fifth lens unit L5 having the negative refractive power is composed of one negative lens Fa. The lens unit LRP having the positive refractive power is arranged at the side closest to the image, thereby converges the luminous flux on the object side of itself, and thereby reduces the effective diameter of the lens Fa that is arranged on the object side of the lens unit LRP.

In addition, the lens Fa is configured to have a negative refractive power to shorten the total lens length and miniaturize the whole system. In addition, the compact and lightweight lens Fa is adopted as a focus lens, which thereby facilitates quick focusing. The lens Fa is configured to move to the image side at the time of focusing from infinity to close range.

In the cross-sectional view of the zoom lens, a solid line curve Faa and a dotted curve line Fab concerning the lens Fa are movement loci for correcting the fluctuations of the image point, which occur during zooming at the time when the lens Fa adjusts the focus to the infinity and to the close range, respectively. In addition, when the lens Fa adjusts the focus from the infinity to the close range, at the telephoto end, the lens Fa moves to the image side to adjust the focus, as shown by the arrow Fac. In addition, the lens Fa is configured to have a refractive power of an opposite sign to that of the lens unit LRP having the positive refractive power, and thereby to have a strong negative refractive power. Thereby, the lens Fa is configured so as to have higher position sensitivity than that in the case, for instance, where the lens unit LRP adjusts the focus, and so as to reduce the amount of movement during focusing.

A zoom lens of Embodiment 7 includes the following lens units that are arranged sequentially from the object side to the image side. The zoom lens includes the first lens unit L1 having a positive refractive power, the second lens unit L2 having a negative refractive power, an aperture stop SP1, the third lens unit L3 having a positive refractive power, and the fourth lens unit L4 having a positive refractive power.

In Embodiment 7, in order to miniaturize the whole system at a zoom magnification of approximately 3 by an f-number of 2.06 of a large f-number at the wide-angle end, the zoom configuration has the following configuration, sequentially from the object side to the image side. The zoom configuration has a lens configuration of a positive lead having the first lens unit having the positive refractive power, the second lens unit (lens unit LN) having the negative refractive power, and the third lens unit (lens unit LP) having the positive refractive power.

At the time of zooming from the wide-angle end to the telephoto end, the first lens unit L1 moves to the object side, the second lens unit L2 moves to the object side while drawing a convex locus to the image side, the aperture stop SP1 moves to the object side while drawing a different locus from that of the other lens units, and the third lens unit L3 moves to the object side. The fourth lens unit L4 moves to the image side. The flare cut stop SP2 moves integrally with the third lens unit L3.

The first lens unit L1 moves so as to be positioned at a side closer to the object at the telephoto end compared to the wide-angle end, and thereby is configured to make the focal length at the telephoto end long, while shortening the total lens length at the wide-angle end.

The second lens unit L2 is moved so as to be positioned at a side closer to the object while drawing a convex locus to the image side to shorten the total lens length at the wide-angle end, at the time of zooming from the wide-angle end to the telephoto end, and the aperture stop SP1 and the first lens unit L1 are brought close to each other to reduce the effective diameter of a front lens. In addition, at the time of zooming, the aperture stop SP1 moves while drawing the different locus from each of the lens units. The aperture stop SP1 moves to the object side at the time of zooming from the wide-angle end to the telephoto end, and thereby cuts off the under rays of the off-axis light beams at the time of zooming to obtain adequate optical performance.

In addition, at the time of zooming from the wide-angle end to the telephoto end, the fourth lens unit L4 having the positive refractive power moves to the image side to show the zooming effect, which reduces the amount of movement of the third lens unit L3 at the time of zooming, and shortens the total lens length at the telephoto end.

In the present embodiment, the fourth lens unit L4 is a lens unit LRP which is positioned at the side closest to the image and has the positive refractive power. The lens unit LRP is composed of one positive lens. The lens unit LRP is configured to have the positive refractive power, thereby locates the exit pupil at the wide-angle end away to the object side, and makes the telecentricity adequate. In addition, the lens unit LRP is provided with a certain degree of positive refractive power to miniaturize the lens unit existing on a side closer to the object than the lens unit LRP, while making the telecentricity adequate.

In addition, in order to alleviate an influence on the optical performance due to the change of the shape of the lens surface, which originates in the environmental change, the lens unit LRP is arranged at a position close to the imaging point (image plane). When the lens unit LRP is arranged at a position close to the imaging point, the effective diameter of the lens becomes large; and accordingly if the lens unit LRP includes a plurality of lenses, the thickness of the lens unit increases, which increases the size of the lens unit. Therefore, the lens unit LRP is composed of one lens GRP. In addition, because the lens unit LRP is arranged at a position close to the imaging point, the effective diameter of the lens becomes large, and accordingly the lens becomes heavy in such an optical system as to correspond to a large size sensor.

Therefore, the material of the lens GRP is made from a resin to reduce the weight. In addition, the lens GRP is configured to have a meniscus shape of which the convex surface faces the image side. Because there are restrictions on working for lenses, a certain degree of thickness needs to be given to the peripheral portion of the lens. If a thickness is given to a peripheral portion of a lens having a shape such as a biconvex lens, a material thickness of the center increases, and a thickness of the retractable barrel increases, which becomes disadvantageous for the compactness. Therefore, if a sensor having a large-sized effective surface is used, the effective diameter of the lens GRP becomes large, and accordingly the material thickness of the center tends to become thick.

Then, the lens GRP is configured to obtain a certain peripheral material thickness (edge) by being formed into a meniscus shape, while suppressing an increase of the material thickness of the center. In addition, when there is a lens surface of which the convex surface faces the sensor side, there is a case where the ghost ray is generated in the vicinity of the center of the image, due to reflection on the cover glass of the sensor, or on the optical filter in between the lens GRP and the cover glass of the sensor. Then, the lens GRP is configured to have such a meniscus shape that both of the lens surfaces have convex shapes toward the image side, and thereby avoids the ghost ray which is incident on the vicinity of the center of the screen.

In addition, when the material of the lens GRP is a resin, the reflectivity of a coating formed on the lens surface is generally high compared to that of a coating on a glass material, and the ghost strength also increases. Therefore, in order to reduce the occurrence of the ghost, the lens is configured to have the meniscus shape. The third lens unit L3 having the positive refractive power has a negative lens Fa on the image side. The lens unit LRP having the positive refractive power is arranged at the side closest to the image, thereby converges the luminous flux on the object side of itself, and thereby reduces the effective diameter of the lens Fa that is arranged on the object side of the lens unit LRP.

In addition, the lens Fa is configured to have a negative refractive power to shorten the total lens length and miniaturize the whole system. In addition, the compact and lightweight lens Fa is configured to be a focus lens, which thereby facilitates quick focusing. The lens Fa is configured to move to the image side at the time of focusing from infinity to close range.

In the cross-sectional view of the zoom lens, a solid line curve Faa and a dotted line curve Fab concerning the lens Fa are movement loci for correcting the fluctuations of the image point, which occur during zooming at the time when the lens Fa adjusts the focus to the infinity and to the close range, respectively. In addition, when the lens Fa adjusts the focus from the infinity to the close range, at the telephoto end, the lens Fa moves to the image side to adjust the focus, as shown by the arrow Fac. In addition, the lens Fa is configured to have a refractive power of an opposite sign to that of the lens unit LRP having the positive refractive power, and thereby to have a strong negative refractive power. Thereby, the lens Fa is configured so as to have higher position sensitivity than that in the case where the lens unit LRP, for instance, adjusts the focus, and so as to reduce the amount of movement during focusing.

Next, an embodiment of a digital camera (image pickup apparatus) that uses the zoom lens in the present invention as an imaging optical system will be described below with reference to FIG. 17. In FIG. 17, a main body 20 of a digital camera is illustrated, an imaging optical system 21 includes the zoom lens in the above described embodiment, and an image pickup device 22 receives light of a subject image through the imaging optical system 21, such as a CCD. Recording means 23 records the subject image which the image pickup device 22 has received, and a finder 24 is provided for observing the subject image that is displayed on an unillustrated display element.

The above described display element includes a liquid crystal panel and the like, and the subject image is displayed thereon that has been formed on the image pickup device 22. The liquid crystal display panel 24 has a function equivalent to that of the finder. Thus, the zoom lens in the present invention is applied to the image pickup apparatus such as the digital camera, and thereby the image pickup apparatus having a small size and a high optical performance is achieved. Incidentally, the zoom lens in the present invention can be used not only for imaging optical systems such as a video camera and a digital still camera, but also for projection optical systems such as a projector.

Next, numerical data of each of the embodiments in the present invention will be shown. In each of the numerical data, i represents the order of surfaces from the object side, ri represents a radius of curvature of the lens surface, di represents a lens material thickness and an air space between the i-th surface and the (i+1)-th surface, and ndi and vdi represent the refractive index and the Abbe number of the material with respect to the d line, respectively. BF is a back focus, and represents a distance in terms of air between the final lens surface and the image plane. The total lens length is a value obtained by adding the back focus to a distance between the first lens surface and the final lens surface.

In the numerical data, the two surfaces on the side closest to the image are glass materials such as a face plate. When the optical axis direction is represented by an X-axis, a direction perpendicular to the optical axis is represented by an H-axis, a light traveling direction is determined to be positive, the paraxial radius of curvature is represented by R, the conical constant is represented by K, and each of the aspheric coefficients is represented by A4, A6, A8 and A10, the aspheric shape is expressed by the following expression.

$$X = \frac{(1/R)H^2}{1 + \sqrt{1-(1+K)(H/R)^2}} + \quad \text{[Expression 1]}$$

$$A4 \times H^4 \times A6 \times H^6 \times A8 \times H^8 \times A10 \times H^{10}$$

In addition, [e+X] means [×10$^{+x}$], and [e−X] means [×10$^{-x}$]. The aspheric surface is shown by adding * after the surface number. In addition, the portion where the distance d between each of the optical surfaces is described as (variable) means that the distance varies at the time of zooming, and the surface interval according to the focal length is described. Table 1 shows the relationship between each of the conditional expressions and the numerical data.

Numerical Data 1

| Unit mm | | | | |
|---|---|---|---|---|
| Surface data | | | | |
| Surface number | r | d | nd | νd |
| 1 | 72.385 | 0.85 | 1.95375 | 32.3 |
| 2 | 15.467 | 4.37 | | |
| 3* | 69.590 | 1.40 | 1.58254 | 59.4 |
| 4* | 30.598 | 0.15 | | |
| 5 | 22.015 | 2.13 | 1.95906 | 17.5 |
| 6 | 43.965 | (Variable) | | |
| 7 | ∞ | (Variable) | | (Aperture stop) |
| 8* | 13.218 | 2.67 | 1.69350 | 53.2 |
| 9* | −451.693 | 0.85 | | |
| 10 | 19.036 | 2.88 | 2.00100 | 29.1 |
| 11 | −13.619 | 0.60 | 1.85478 | 24.8 |
| 12 | 8.657 | 2.00 | | |
| 13 | ∞ | (Variable) | | (Flare cut stop) |
| 14 | 432.415 | 2.05 | 1.76802 | 49.2 |
| 15* | −25.201 | 2.65 | | |
| 16 | −24.719 | 0.70 | 1.80610 | 33.3 |
| 17 | −79.764 | (Variable) | | |
| 18* | −71.000 | 3.60 | 1.53160 | 55.8 |
| 19* | −19.774 | (Variable) | | |
| 20 | ∞ | 1.33 | 1.51633 | 64.1 |
| 21 | ∞ | 0.50 | | |
| Image plane | ∞ | | | |

| Aspheric data | | |
|---|---|---|
| Third surface | | |
| K = 0.00000e+000 | A4 = −2.29993e−005 | A6 = −2.10057e−007 |
| A8 = 1.05970e−009 | | |
| Fourth surface | | |
| K = 0.00000e+000 | A4 = −3.26997e−005 | A6 = −2.89658e−007 |
| A8 = 1.75014e−009 | A10 = −2.31976e−012 | |
| Eighth surface | | |
| K = 0.00000e+000 | A4 = −6.50277e−005 | A6 = −5.56369e−007 |
| A8 = −4.17807e−009 | | |
| Ninth surface | | |
| K = 0.00000e+000 | A4 = 2.15406e−005 | A6 = −2.86214e−007 |
| Fifteenth surface | | |
| K = 0.00000e+000 | A4 = 2.53751e−006 | A6 = −4.54443e−008 |
| A8 = −1.37807e−010 | | |
| Eighteenth surface | | |
| K = 0.00000e+000 | A4 = −2.39006e−005 | A6 = 1.71586e−008 |
| Nineteenth surface | | |
| K = 0.00000e+000 | A4 = 3.74727e−005 | A6 = −1.29539e−007 |
| A8 = 3.60781e−010 | | |

| Various data | | | |
|---|---|---|---|
| Zoom ratio 2.83 | | | |
| | Wide angle | Middle | Telephoto |
| Focal length | 15.45 | 26.05 | 43.70 |
| F-number | 2.88 | 4.00 | 5.77 |
| Half angle of view (degree) | 38.02 | 27.28 | 17.09 |
| Total lens length | 69.61 | 66.93 | 75.45 |
| BF | 9.31 | 7.77 | 4.70 |
| d6 | 20.75 | 7.77 | 2.12 |
| d7 | 1.87 | 1.94 | 0.10 |
| d13 | 5.35 | 6.98 | 10.31 |
| d17 | 5.42 | 15.57 | 31.32 |
| d19 | 7.93 | 6.39 | 3.33 |

| Lens unit data | | |
|---|---|---|
| Unit | Beginning surface | Focal length |
| 1 | 1 | −28.85 |
| 2 | 8 | 25.60 |
| 3 | 14 | 85.90 |
| 4 | 18 | 50.33 |

Numerical Data 2

| Unit mm | | | | |
|---|---|---|---|---|
| Surface data | | | | |
| Surface number | r | d | nd | νd |
| 1 | 76.177 | 0.85 | 1.95375 | 32.3 |
| 2 | 15.480 | 4.33 | | |
| 3* | 63.922 | 1.40 | 1.58254 | 59.4 |
| 4* | 30.309 | 0.15 | | |
| 5 | 22.415 | 2.10 | 1.95906 | 17.5 |
| 6 | 45.370 | (Variable) | | |
| 7 | ∞ | (Variable) | | (Aperture stop) |
| 8* | 13.260 | 2.50 | 1.69350 | 53.2 |
| 9* | −252.514 | 1.05 | | |
| 10 | 19.577 | 2.85 | 2.00100 | 29.1 |
| 11 | −14.122 | 0.60 | 1.85478 | 24.8 |
| 12 | 8.753 | 2.00 | | |
| 13 | ∞ | (Variable) | | (Flare cut stop) |
| 14 | 1159.801 | 2.00 | 1.76802 | 49.2 |
| 15* | −26.134 | (Variable) | | |
| 16 | −28.232 | 0.70 | 1.80610 | 33.3 |
| 17 | −111.234 | (Variable) | | |
| 18* | −61.614 | 3.60 | 1.53160 | 55.8 |
| 19* | −18.786 | (Variable) | | |
| 20 | ∞ | 1.33 | 1.51633 | 64.1 |
| 21 | ∞ | 0.50 | | |
| Image plane | ∞ | | | |

| Aspheric data | | |
|---|---|---|
| Third surface | | |
| K = 0.00000e+000 | A4 = −3.20571e−005 | A6 = −1.79053e−007 |
| A8 = 9.94695e−010 | | |
| Fourth surface | | |
| K = 0.00000e+000 | A4 = −4.32412e−005 | A6 = −2.39119e−007 |
| A8 = 1.58900e−009 | A10 = −2.16213e−012 | |
| Eighth surface | | |
| K = 0.00000e+000 | A4 = −6.11718e−005 | A6 = −4.42878e−007 |
| A8 = −1.42054e−009 | | |
| Ninth surface | | |
| K = 0.00000e+000 | A4 = 2.38598e−005 | A6 = −9.14994e−008 |
| Fifteenth surface | | |
| K = 0.00000e+000 | A4 = 5.08822e−006 | A6 = −7.86877e−008 |
| A8 = 2.82420e−010 | | |
| Eighteenth surface | | |
| K = 0.00000e+000 | A4 = −2.39034e−005 | A6 = −6.84167e−008 |
| Nineteenth surface | | |
| K = 0.00000e+000 | A4 = 4.25742e−005 | A6 = −2.29214e−007 |
| A8 = 4.47635e−010 | | |

-continued

Unit mm

Various data
Zoom ratio 2.83

|  | Wide angle | Middle | Telephoto |
|---|---|---|---|
| Focal length | 15.45 | 26.10 | 43.70 |
| F-number | 2.88 | 4.00 | 5.77 |
| Half angle of view (degree) | 38.02 | 27.24 | 17.09 |
| Total lens length | 69.92 | 65.94 | 75.45 |
| BF | 9.60 | 7.27 | 4.70 |
| d6 | 21.06 | 8.15 | 2.08 |
| d7 | 2.00 | 1.41 | 0.54 |
| d13 | 4.84 | 7.25 | 10.30 |
| d15 | 2.65 | 4.27 | 3.20 |
| d17 | 5.63 | 13.46 | 30.48 |
| d19 | 8.23 | 5.90 | 3.32 |

Lens unit data

| Unit | Beginning surface | Focal length |
|---|---|---|
| 1 | 1 | −28.78 |
| 2 | 8 | 25.49 |
| 3 | 14 | 33.30 |
| 4 | 16 | −47.11 |
| 5 | 18 | 49.40 |

Numerical Data 3

Unit mm

Surface data

| Surface number | r | d | nd | vd |
|---|---|---|---|---|
| 1 | 86.354 | 0.85 | 1.95375 | 32.3 |
| 2 | 15.365 | 4.40 | | |
| 3* | 68.690 | 1.40 | 1.58254 | 59.4 |
| 4* | 32.643 | 0.15 | | |
| 5 | 22.569 | 2.11 | 1.95906 | 17.5 |
| 6 | 46.608 | (Variable) | | |
| 7 | ∞ | (Variable) | | (Aperture stop) |
| 8* | 13.458 | 2.60 | 1.69350 | 53.2 |
| 9* | −268.733 | 0.35 | | |
| 10 | 23.540 | 3.15 | 2.00100 | 29.1 |
| 11 | −12.320 | 0.82 | 1.85478 | 24.8 |
| 12 | 10.262 | 2.00 | | |
| 13 | ∞ | 3.71 | | (Flare cut stop) |
| 14 | −53.517 | 1.47 | 1.76802 | 49.2 |
| 15* | −21.120 | 2.65 | | |
| 16 | −31.732 | 0.70 | 1.80610 | 33.3 |
| 17 | −142.834 | (Variable) | | |
| 18* | −50.467 | 3.60 | 1.53160 | 55.8 |
| 19* | −17.585 | (Variable) | | |
| 20 | ∞ | 1.33 | 1.51633 | 64.1 |
| 21 | ∞ | 0.50 | | |
| Image plane | ∞ | | | |

Aspheric data

Third surface

K = 0.00000e+000  A4 = −3.83330e−005  A6 = −1.60396e−007
A8 = 1.25292e−009

Fourth surface

K = 0.00000e+000  A4 = −4.47779e−005  A6 = −3.18998e−007
A8 = 3.12463e−009  A10 = −7.99987e−012

Eighth surface

K = 0.00000e+000  A4 = −5.35647e−005  A6 = −5.56536e−007
A8 = −6.46988e−009

Ninth surface

K = 0.00000e+000  A4 = 4.12119e−005  A6 = −4.95645e−007

Fifteenth surface

K = 0.00000e+000  A4 = 3.55964e−005  A6 = 5.59560e−007
A8 = −8.33974e−010

Eighteenth surface

K = 0.00000e+000  A4 = −2.26492e−005  A6 = 1.83959e−008

Nineteenth surface

K = 0.00000e+000  A4 = 4.58290e−005  A6 = −1.14816e−007
A8 = 4.13267e−010

Various data
Zoom ratio 2.85

|  | Wide angle | Middle | Telephoto |
|---|---|---|---|
| Focal length | 15.46 | 25.98 | 44.06 |
| F-number | 2.88 | 4.00 | 5.77 |
| Half angle of view (degree) | 38.01 | 27.34 | 16.96 |
| Total lens length | 71.07 | 67.77 | 75.11 |
| BF | 9.46 | 7.86 | 6.46 |
| d6 | 22.06 | 10.86 | 2.05 |
| d7 | 2.00 | 0.31 | 0.95 |
| d17 | 7.59 | 18.79 | 35.69 |
| d19 | 8.08 | 6.48 | 5.08 |

Lens unit data

| Unit | Beginning surface | Focal length |
|---|---|---|
| 1 | 1 | −28.34 |
| 2 | 8 | 22.17 |
| 3 | 18 | 48.91 |

Numerical Data 4

Unit mm

Surface data

| Surface number | r | d | nd | vd |
|---|---|---|---|---|
| 1 | 107.675 | 0.85 | 1.95375 | 32.3 |
| 2 | 15.365 | 4.29 | | |
| 3* | 57.993 | 1.40 | 1.58254 | 59.4 |
| 4* | 32.782 | 0.15 | | |
| 5 | 23.195 | 2.21 | 1.95906 | 17.5 |
| 6 | 50.732 | (Variable) | | |
| 7 | ∞ | (Variable) | | (Aperture stop) |
| 8* | 13.458 | 2.57 | 1.69350 | 53.2 |
| 9* | −234.194 | 1.21 | | |
| 10 | 23.540 | 2.47 | 2.00100 | 29.1 |
| 11 | −16.816 | 0.75 | 1.85478 | 24.8 |
| 12 | 9.699 | 2.00 | | |
| 13 | ∞ | 2.00 | | (Flare cut stop) |
| 14 | −46.114 | 1.72 | 1.76802 | 49.2 |
| 15* | −16.256 | (Variable) | | |
| 16 | −34.050 | 0.70 | 1.80610 | 33.3 |
| 17 | −121.429 | (Variable) | | |
| 18* | −33.823 | 2.80 | 1.53160 | 55.8 |
| 19* | −16.570 | (Variable) | | |
| 20 | ∞ | 1.33 | 1.51633 | 64.1 |
| 21 | ∞ | 0.50 | | |
| Image plane | ∞ | | | |

-continued

Unit mm

Aspheric data

Third surface

K = 0.00000e+000  A4 = −1.06359e−005  A6 = −2.68411e−007
A8 = 32043e−010

Fourth surface

K = 0.00000e+000  A4 = −2.19216e−005  A6 = −3.94269e−007
A8 = 60051e−009  A10 = −3.69410e−012

Eighth surface

K = 0.00000e+000  A4 = −4.34609e−005  A6 = −4.93812e−007
A8 = −1.90265e−009

Ninth surface

K = 0.00000e+000  A4 = 5.08035e−005  A6 = −3.61157e−007

Fifteenth surface

K = 0.00000e+000  A4 = 7.42345e−007  A6 = −1.70959e−008
A8 = −5.26961e−009

Eighteenth surface

K = 0.00000e+000  A4 = −1.12699e−004  A6 = 1.27792e−007

Nineteenth surface

K = 0.00000e+000  A4 = −3.31793e−005  A6 = 2.89532e−008
A8 = 3.83682e−010

Various data
Zoom ratio 2.83

|  | Wide angle | Middle | Telephoto |
|---|---|---|---|
| Focal length | 15.45 | 26.00 | 43.70 |
| F-number | 2.88 | 4.00 | 5.77 |
| Half angle of view (degree) | 38.02 | 27.32 | 17.09 |
| Total lens length | 70.93 | 66.54 | 73.72 |
| BF | 8.60 | 6.42 | 3.67 |
| d6 | 21.89 | 8.91 | 1.96 |
| d7 | 2.00 | 1.46 | 0.56 |
| d15 | 3.88 | 3.45 | 2.00 |
| d17 | 9.44 | 21.18 | 40.41 |
| d19 | 7.22 | 5.05 | 2.30 |

Lens unit data

| Unit | Beginning surface | Focal length |
|---|---|---|
| 1 | 1 | −28.72 |
| 2 | 8 | 19.56 |
| 3 | 16 | −58.91 |
| 4 | 18 | 57.85 |

Numerical Data 5

Unit mm

Surface data

| Surface number | r | d | nd | vd |
|---|---|---|---|---|
| 1 | 53.363 | 1.20 | 1.92286 | 18.9 |
| 2 | 39.151 | 4.00 | 1.80400 | 46.6 |
| 3 | 565.753 | (Variable) | | |
| 4 | −1047.940 | 0.85 | 1.88300 | 40.8 |
| 5 | 15.920 | 5.58 | | |
| 6* | −116.623 | 1.00 | 1.59349 | 67.0 |
| 7* | 28.424 | 0.30 | | |
| 8 | 22.099 | 2.77 | 1.89286 | 20.4 |
| 9 | 63.415 | (Variable) | | |
| 10 | ∞ | (Variable) | | (Aperture stop) |
| 11* | 15.387 | 4.72 | 1.80400 | 46.6 |
| 12* | −99.467 | 0.20 | | |
| 13 | 21.029 | 3.00 | 1.88300 | 40.8 |
| 14 | −59.848 | 0.60 | 2.00069 | 25.5 |
| 15 | 11.045 | 3.00 | | |
| 16 | ∞ | (Variable) | | (Flare cut stop) |
| 17 | 41.297 | 2.20 | 1.80400 | 46.6 |
| 18 | −26.211 | 2.77 | | |
| 19 | −73.189 | 0.70 | 1.57501 | 41.5 |
| 20* | 24.205 | (Variable) | | |
| 21 | −31.505 | 3.20 | 1.53160 | 55.8 |
| 22* | −15.599 | (Variable) | | |
| 23 | ∞ | 1.33 | 1.51633 | 64.1 |
| 24 | ∞ | 0.50 | | |
| Image plane | ∞ | | | |

Aspheric data

Sixth surface

K = 0.00000e+000  A4 = −2.70312e−005  A6 = 1.81565e−007
A8 = 3.61239e−011

Seventh surface

K = 0.00000e+000  A4 = −2.62482e−005  A6 = 2.54496e−007
A8 = −1.73565e−011

Eleventh surface

K = 0.00000e+000  A4 = −3.12027e−005  A6 = 4.12187e−008
A8 = 5.80290e−010

Twelfth surface

K = 0.00000e+000  A4 = 1.75769e−005  A6 = 1.77088e−007

Twentieth surface

K = 0.00000e+000  A4 = 2.36822e−005  A6 = −2.76179e−008
A8 = 6.96926e−010

Twenty second surface

K = 0.00000e+000  A4 = 7.98026e−005  A6 = −2.19269e−007
A8 = 1.12700e−009

Various data
Zoom ratio 3.77

|  | Wide angle | Middle | Telephoto |
|---|---|---|---|
| Focal length | 15.40 | 29.90 | 58.00 |
| F-number | 2.06 | 3.50 | 5.00 |
| Half angle of view (degree) | 38.11 | 24.20 | 13.04 |
| Total lens length | 79.22 | 87.08 | 101.45 |
| BF | 9.93 | 7.79 | 4.58 |
| d3 | 0.93 | 10.03 | 19.66 |
| d9 | 19.90 | 10.00 | 1.76 |
| d10 | 2.13 | 0.36 | 0.60 |
| d16 | 3.09 | 4.75 | 6.33 |
| d20 | 7.15 | 18.07 | 32.44 |
| d22 | 8.55 | 6.41 | 3.20 |

Lens unit data

| Unit | Beginning surface | Focal length |
|---|---|---|
| 1 | 1 | 77.34 |
| 2 | 4 | −17.97 |
| 3 | 11 | 30.58 |
| 4 | 17 | 42.87 |
| 5 | 21 | 54.32 |

Numerical Data 6

Unit mm

Surface data

| Surface number | r | d | nd | vd |
|---|---|---|---|---|
| 1 | 42.404 | 1.40 | 1.92286 | 18.9 |
| 2 | 33.168 | 4.14 | 1.80400 | 46.6 |
| 3 | 125.784 | (Variable) | | |
| 4 | 180.373 | 0.85 | 1.88300 | 40.8 |
| 5 | 15.819 | 6.00 | | |
| 6* | −106.231 | 1.00 | 1.59349 | 67.0 |
| 7* | 29.694 | 0.30 | | |
| 8 | 22.099 | 2.32 | 1.95906 | 17.5 |
| 9 | 41.780 | (Variable) | | |
| 10 | ∞ | (Variable) | | (Aperture stop) |
| 11* | 15.387 | 4.57 | 1.80400 | 46.6 |
| 12* | −99.467 | 0.20 | | |
| 13 | 21.029 | 3.11 | 1.88300 | 40.8 |
| 14 | −65.437 | 0.63 | 2.00069 | 25.5 |
| 15 | 11.045 | 3.00 | | |
| 16 | ∞ | (Variable) | | (Flare cut stop) |
| 17 | 62.396 | 2.64 | 1.80400 | 46.6 |
| 18 | −20.400 | (Variable) | | |
| 19 | −22.524 | 0.70 | 1.58144 | 40.8 |
| 20* | 82.582 | (Variable) | | |
| 21* | −63.845 | 3.60 | 1.53160 | 55.8 |
| 22* | −19.406 | (Variable) | | |
| 23 | ∞ | 1.33 | 1.51633 | 64.1 |
| 24 | ∞ | 0.50 | | |
| Image plane | ∞ | | | |

Aspheric data

Sixth surface

K = 0.00000e+000   A4 = −1.84971e−005   A6 = 1.59907e−007
A8 = −2.77982e−010

Seventh surface

K = 0.00000e+000   A4 = −1.34131e−005   A6 = 2.02566e−007
A8 = −1.82008e−010

Eleventh surface

K = 0.00000e+000   A4 = −2.78350e−005   A6 = −2.68313e−009
A8 = 2.42548e−010

Twelfth surface

K = 0.00000e+000   A4 = 2.05164e−005   A6 = 8.89926e−008

Twentieth surface

K = 0.00000e+000   A4 = 1.54792e−005   A6 = −1.00363e−007
A8 = 4.84189e−010

Twenty first surface

K = 0.00000e+000   A4 = −2.50661e−005   A6 = 3.14979e−008

Twenty second surface

K = 0.00000e+000   A4 = 2.92133e−005   A6 = −5.12449e−008
A8 = 2.44928e−010

Various data
Zoom ratio 3.76

| | Wide angle | Middle | Telephoto |
|---|---|---|---|
| Focal length | 15.42 | 29.84 | 58.00 |
| F-number | 2.06 | 3.00 | 5.00 |
| Half angle of view (degree) | 38.07 | 24.24 | 13.04 |
| Total lens length | 82.23 | 89.30 | 103.33 |
| BF | 8.81 | 6.59 | 2.81 |
| d3 | 0.88 | 10.16 | 18.49 |
| d9 | 19.40 | 9.56 | 2.29 |
| d10 | 4.01 | 1.52 | 0.49 |
| d16 | 2.97 | 4.92 | 6.97 |
| d18 | 1.99 | 2.83 | 3.46 |
| d20 | 9.70 | 19.24 | 34.35 |
| d22 | 7.44 | 5.22 | 1.43 |

Lens unit data

| Unit | Beginning surface | Focal length |
|---|---|---|
| 1 | 1 | 81.88 |
| 2 | 4 | −17.35 |
| 3 | 11 | 30.00 |
| 4 | 17 | 19.40 |
| 5 | 19 | −30.36 |
| 6 | 21 | 51.01 |

Numerical Data 7

Unit mm

Surface data

| Surface number | r | d | nd | vd |
|---|---|---|---|---|
| 1 | 59.419 | 1.40 | 1.92286 | 18.9 |
| 2 | 41.939 | 3.73 | 1.80400 | 46.6 |
| 3 | 403.193 | (Variable) | | |
| 4 | 604.628 | 0.85 | 1.88300 | 40.8 |
| 5 | 17.462 | 6.00 | | |
| 6* | −55.628 | 1.00 | 1.59349 | 67.0 |
| 7* | 64.027 | 0.30 | | |
| 8 | 22.083 | 2.28 | 1.95906 | 17.5 |
| 9 | 40.471 | (Variable) | | |
| 10 | ∞ | (Variable) | | (Aperture stop) |
| 11* | 15.881 | 4.78 | 1.80400 | 46.6 |
| 12* | −102.333 | 0.20 | | |
| 13 | 22.194 | 2.83 | 1.88300 | 40.8 |
| 14 | −73.664 | 0.69 | 2.00069 | 25.5 |
| 15 | 11.648 | 3.00 | | |
| 16 | ∞ | 4.00 | | (Flare cut stop) |
| 17 | 214.709 | 2.43 | 1.80400 | 46.6 |
| 18 | −18.869 | 4.08 | | |
| 19* | −22.518 | 0.70 | 1.57501 | 41.5 |
| 20* | 74.572 | (Variable) | | |
| 21 | −132.983 | 3.60 | 1.53160 | 55.8 |
| 22* | −23.101 | (Variable) | | |
| 23 | ∞ | 1.33 | 1.51633 | 64.1 |
| 24 | ∞ | 0.50 | | |
| Image plane | ∞ | | | |

Aspheric data

Sixth surface

K = 0.00000e+000   A4 = 4.73869e−005   A6 = −3.44001e−007
A8 = 1.43598e−009

Seventh surface

K = 0.00000e+000   A4 = 6.44763e−005   A6 = −4.29196e−007
A8 = 2.01664e−009

Eleventh surface

K = 0.00000e+000   A4 = −2.75727e−005   A6 = 1.79127e−008
A8 = 8.02041e−010

Twelfth surface

K = 0.00000e+000   A4 = 2.28715e−005   A6 = 1.78087e−007

Nineteenth surface

K = 0.00000e+000   A4 = −3.83374e−005   A6 = 1.12279e−006

Twentieth surface

K = 0.00000e+000   A4 = −3.87533e−005   A6 = 1.07352e−006
A8 = −1.07522e−009

Unit mm

Twenty second surface

K = 0.00000e+000   A4 = 3.98755e−005   A6 = 2.43085e−008
A8 = −2.22202e−010

Various data
Zoom ratio 3.75

|  | Wide angle | Middle | Telephoto |
|---|---|---|---|
| Focal length | 15.45 | 30.20 | 58.00 |
| F-number | 2.06 | 4.00 | 5.00 |
| Half angle of view (degree) | 38.01 | 23.98 | 13.04 |
| Total lens length | 82.75 | 84.47 | 101.72 |
| BF | 10.34 | 7.55 | 4.64 |

Unit mm

| | | | |
|---|---|---|---|
| d3 | 0.66 | 4.44 | 15.98 |
| d9 | 22.45 | 8.70 | 2.23 |
| d10 | 2.64 | 1.92 | 0.71 |
| d20 | 4.77 | 19.98 | 36.28 |
| d22 | 8.97 | 6.17 | 3.27 |

Lens unit data

| Unit | Beginning surface | Focal length |
|---|---|---|
| 1 | 1 | 92.50 |
| 2 | 4 | −20.44 |
| 3 | 11 | 22.66 |
| 4 | 21 | 52.00 |

TABLE 1

| | Conditional Expression | | Embodiment 1 | 2 | 3 | 4 | 5 | 6 | 7 |
|---|---|---|---|---|---|---|---|---|---|
| (1) | BkT/fW | | 0.304 | 0.304 | 0.418 | 0.238 | 0.297 | 0.182 | 0.300 |
| | BkT | | 4.702 | 4.702 | 6.457 | 3.674 | 4.577 | 2.812 | 4.643 |
| | fW | | 15.450 | 15.450 | 15.456 | 15.450 | 15.399 | 15.423 | 15.452 |
| (2) | fP/mP | | 10.925 | 10.076 | 16.308 | 11.740 | 10.151 | 8.501 | 9.122 |
| | fP | | 50.328 | 49.397 | 48.910 | 57.846 | 54.324 | 51.013 | 52.000 |
| | mP | | 4.607 | 4.903 | 2.999 | 4.927 | 5.352 | 6.001 | 5.700 |
| (3) | fP/fLP | | 1.966 | 1.938 | 2.218 | 2.957 | 1.777 | 1.700 | 2.307 |
| | fP | | 50.328 | 49.397 | 48.910 | 57.846 | 54.324 | 51.013 | 52.000 |
| | fLP | | 25.597 | 25.491 | 22.052 | 19.565 | 30.578 | 30.005 | 22.543 |
| (4) | R1sag/D | | −0.480 | −0.617 | −0.570 | −1.494 | −0.804 | −0.523 | −0.176 |
| | R1sag | | −1.729 | −2.220 | −2.051 | −4.182 | −2.572 | −1.884 | −0.635 |
| | D | | 3.600 | 3.600 | 3.600 | 2.800 | 3.200 | 3.600 | 3.600 |
| (5) | d | | 1.010 | 1.010 | 1.010 | 1.010 | 1.010 | 1.010 | 1.010 |
| (6) | (R1 + R2)/(R1 − R2) | | 1.772 | 1.877 | 2.070 | 2.921 | 2.961 | 1.873 | 1.420 |
| | R1 | | −71.000 | −61.614 | −50.467 | −33.823 | −31.505 | −63.845 | −132.983 |
| | R2 | | −19.774 | −18.786 | −17.585 | −16.570 | −15.599 | −19.406 | −23.101 |
| (7) | fP/fW | | 3.257 | 3.197 | 3.165 | 3.744 | 3.528 | 3.308 | 3.365 |
| | fP | | 50.328 | 49.397 | 48.910 | 57.846 | 54.324 | 51.013 | 52.000 |
| | fW | | 15.450 | 15.450 | 15.456 | 15.450 | 15.399 | 15.423 | 15.452 |
| (8) | fP/√(fW × fT) | | 1.937 | 1.901 | 1.874 | 2.226 | 1.818 | 1.706 | 1.737 |
| | fP | | 50.328 | 49.397 | 48.910 | 57.846 | 54.324 | 51.013 | 52.000 |
| | fW | | 15.450 | 15.450 | 15.456 | 15.450 | 15.399 | 15.423 | 15.452 |
| | fT | | 43.700 | 43.700 | 44.060 | 43.700 | 58.000 | 58.000 | 57.999 |
| (9) | |fP/fLN| | | 1.744 | 1.716 | 1.726 | 2.014 | 3.024 | 2.941 | 2.544 |
| | fP | | 50.328 | 49.397 | 48.910 | 57.846 | 54.324 | 51.013 | 52.000 |
| | fLN | | −28.852 | −28.783 | −28.339 | −28.720 | −17.967 | −17.348 | −20.437 |
| (10) | vd | | 55.840 | 55.840 | 55.840 | 55.840 | 55.840 | 55.840 | 55.840 |
| (11) | ndP | | 1.5316 | 1.5316 | 1.5316 | 1.5316 | 1.5316 | 1.5316 | 1.5316 |
| (12) | |mLN/mP| | | 1.270 | 1.128 | 1.348 | 0.566 | 0.654 | 0.583 | 0.641 |
| | mLN | | −5.849 | −5.532 | −4.041 | −2.789 | −3.499 | −3.498 | −3.653 |
| | mP | | 4.607 | 4.903 | 2.999 | 4.927 | 5.352 | 6.001 | 5.700 |
| (13) | |mLP/mP| | | 5.698 | 5.295 | 8.371 | 4.903 | 4.330 | 4.020 | 4.528 |
| | mLP | | −26.248 | −25.959 | −25.107 | −24.157 | −23.174 | −24.122 | −25.810 |
| | mP | | 4.607 | 4.903 | 2.999 | 4.927 | 5.352 | 6.001 | 5.700 |
| (14) | fLP/fLN | | 0.887 | 0.886 | 0.778 | 0.681 | 1.702 | 1.730 | 1.103 |
| | fLN | | −28.852 | −28.783 | −28.339 | −28.720 | −17.967 | −17.348 | −20.437 |
| | fLP | | 25.597 | 25.491 | 22.052 | 19.565 | 30.578 | 30.005 | 22.543 |
| (15) | mLN/mLP | | 0.223 | 0.213 | 0.161 | 0.115 | 0.151 | 0.145 | 0.142 |
| | mLN | | −5.849 | −5.532 | −4.041 | −2.789 | −3.499 | −3.498 | −3.653 |
| | mLP | | −26.248 | −25.959 | −25.107 | −24.157 | −23.174 | −24.122 | −25.810 |
| (16) | G1Nd | | 1.954 | 1.954 | 1.954 | 1.954 | 1.883 | 1.883 | 1.883 |
| (17) | fa/fP | | −0.888 | −0.954 | −1.038 | −1.018 | −0.581 | −0.595 | −0.577 |
| | fa | | −44.689 | −47.113 | −50.751 | −58.912 | −31.550 | −30.363 | −30.000 |
| | fP | | 50.328 | 49.397 | 48.910 | 57.846 | 54.324 | 51.013 | 52.000 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-252696, filed Dec. 27, 2016, which is hereby incorporated by reference herein in its entirety.

What is claimed is:

1. A zoom lens comprising:
a lens unit LN having a negative refractive power, a lens unit LP that is arranged adjacent to an image side of the lens unit LN and has a positive refractive power; and
a rear lens group that comprises one or more lens units arranged on an image side of the lens unit LP,
wherein a distance between adjacent lens units changes at the time of zooming,
wherein the rear lens group includes a lens unit LRP having a positive refractive power and arranged on a side closest to an image,
wherein the lens unit LN comprises a negative lens, a negative lens and a positive lens, which are arranged sequentially from an object side of the lens unit to the image side,
wherein the lens unit LRP comprises a positive lens GRP that has a meniscus shape with a convex surface on the image side and uses a resin material, and
wherein the following conditional expressions are satisfied:

$0.15 < BkT/fW < 0.50$, $8.0 < fRP/mRP < 50.0$, $1.40 < fRP/fLP < 3.50$, and $-3.00 < R1sag/DGRP < -0.15$, where fW represents a focal length of the zoom lens at a wide-angle end, BkT represents a back focus at a telephoto end, fRP represents a focal length of the lens unit LRP, mRP represents an amount of movement of the lens unit LRP at the time of zooming from the wide-angle end to the telephoto end, fLP represents a focal length of the lens unit LP, DGRP represents a thickness on an optical axis of the positive lens GRP, R1sag represents a distance in an optical axis direction between a lens center on a lens surface on an object side of the positive lens GRP and an end of an effective surface of the lens surface on the object side, and a sign of the amount of movement is determined to be minus when the lens unit is positioned at a side closer to an object at the telephoto end compared to the wide-angle end, and be plus when the lens unit is positioned at a side closer to the image.

2. The zoom lens according to claim 1, wherein the following conditional expression is satisfied:

$0.90 < NGRP < 1.30$ where NGRP represents a specific gravity of a material of the positive lens GRP.

3. The zoom lens according to claim 1, wherein the following conditional expression is satisfied:

$1.01 < (R1+R2)/(R1-R2) < 3.50$ where R1 represents a radius of curvature of the lens surface on the object side of the positive lens GRP, and R2 represents a radius of curvature of the lens surface on the image side of the positive lens GRP.

4. The zoom lens according to claim 1, wherein the following conditional expression is satisfied:

$2.0 < fRP/fW < 5.0$.

5. The zoom lens according to claim 1, wherein the following conditional expression is satisfied:

$1.40 < fRP/\sqrt{(fW \times fT)} < 4.00$ where fT represents the focal length of the whole system at the telephoto end.

6. The zoom lens according to claim 1, wherein the following conditional expression is satisfied:

$1.50 < |fRP/fLN| < 5.00$ where fLN represents a focal length of the lens unit LN.

7. The zoom lens according to claim 1, wherein the following conditional expression is satisfied:

$50.0 < vdGRP < 60.0$, where vdGRP represents the Abbe number of the material of the positive lens GRP.

8. The zoom lens according to claim 1, wherein the following conditional expression is satisfied:

$1.50 < ndGRP < 1.60$, where ndGRP represents a refractive index of the material of the positive lens GRP.

9. The zoom lens according to claim 1, wherein the following conditional expression is satisfied:

$0.40 |mLN/mRP| < 1.50$, where mLN represents an amount of movement of the lens unit LN at the time of zooming from the wide-angle end to the telephoto end.

10. The zoom lens according to claim 1, wherein the following conditional expression is satisfied:

$3.50 < |mLP/mRP| < 10.00$, where mLP represents an amount of movement of the lens unit LP at the time of zooming from the wide-angle end to the telephoto end.

11. The zoom lens according to claim 1, wherein the following conditional expression is satisfied:

$0.50 |fLP/fLN| < 2.50$, where fLN represents a focal length of the lens unit LN.

12. The zoom lens according to claim 1, wherein the following conditional expression is satisfied:

$0.05 < mLN/mLP < 0.40$, where mLN represents an amount of movement of the lens unit LN at the time of zooming from the wide-angle end to the telephoto end, and mLP represents an amount of movement of the lens unit LP at the time of zooming from the wide-angle end to the telephoto end.

13. The zoom lens according to claim 1, wherein the lens unit LN comprises three lenses.

14. The zoom lens according to claim 1, wherein the following conditional expression is satisfied:

$1.870 < G1Nd < 2.060$ where G1Nd represents a refractive index of a material of a lens arranged on a side closest to the object in the lens unit LN.

15. The zoom lens according to claim 1, wherein the lens unit LP comprises a positive lens, a positive lens and a negative lens, which are arranged sequentially from the object side.

16. The zoom lens according to claim 1, wherein a negative lens Fa that moves to the image side at the time of focusing from infinity to close range is arranged on the object side of the lens unit LRP.

17. The zoom lens according to claim 16, wherein the following conditional expression is satisfied:

$$-1.30 < fa/fRP < -0.30,$$

where fa represents a focal length of the negative lens unit Fa.

18. The zoom lens according to claim 1, comprising:
a first lens unit having a negative refractive power;
a second lens unit having a positive refractive power;
a third lens unit having a positive refractive power; and
a fourth lens unit having a positive refractive power, which are arranged sequentially from the object side to the image side,
wherein the lens unit LN is the first lens unit and the lens unit LP is the second lens unit.

19. An image pickup apparatus comprising:
a zoom lens and a photoelectric conversion element that receives light of an image that is formed by the zoom lens, wherein the zoom lens comprises:
a lens unit LN having a negative refractive power;
a lens unit LP that is arranged adjacent to an image side of the lens unit LN and has a positive refractive power; and
a rear lens group that comprises one or more lens units arranged on an image side of the lens unit LP, wherein a distance between adjacent lens units changes at the time of zooming,
wherein the rear lens group includes a lens unit LRP having a positive refractive power and arranged on a side closest to an image,
wherein the lens unit LRP comprises a positive lens GRP that has a meniscus shape with a convex surface on the image side and uses a resin material,
wherein the lens unit LN comprises a negative lens, a negative lens and a positive lens, which are arranged sequentially from an object side of the lens unit to the image side, and
wherein the following conditional expressions are satisfied:

$$0.15 < BkT/fW < 0.50,$$

$$8.0 < fRP/mRP < 50.0,$$

$$1.40 < fRP/fLP < 3.50, \text{ and}$$

$$-3.00 < R1sag/DGRP < -0.15,$$

where fW represents a focal length of a whole system at a wide-angle end, BkT represents a back focus at a telephoto end, fRP represents a focal length of the lens unit LRP, mRP represents an amount of movement of the lens unit LRP at the time of zooming from the wide-angle end to the telephoto end, fLP represents a focal length of the lens unit LP, DGRP represents a thickness on an optical axis of the positive lens GRP, R1sag represents a distance in an optical axis direction between a lens center on a lens surface on an object side of the positive lens GRP and an end of an effective surface of the lens surface on the object side, and a sign of the amount of movement is determined to be a minus number when the lens unit is positioned at a side closer to an object at the telephoto end compared to the wide-angle end, and be a plus number when the lens unit is positioned at a side closer to the image.

* * * * *